United States Patent
Votolato

(10) Patent No.: US 10,783,507 B1
(45) Date of Patent: Sep. 22, 2020

(54) CONSUMABLES DISPENSING SYSTEM AND METHOD

(71) Applicant: Spellbound Development Group, Inc., Irvine, CA (US)

(72) Inventor: Earl Joseph Votolato, Newport Beach, CA (US)

(73) Assignee: Spellbound Development Group, Inc., Irvine, CA (US)

( * ) Notice: Subject to any disclaimer, the term of this patent is extended or adjusted under 35 U.S.C. 154(b) by 32 days.

(21) Appl. No.: 16/576,646

(22) Filed: Sep. 19, 2019

Related U.S. Application Data

(63) Continuation-in-part of application No. 16/502,028, filed on Jul. 3, 2019.

(51) Int. Cl.
  G06Q 20/20  (2012.01)
  G07F 7/08  (2006.01)
  G06Q 10/08  (2012.01)
  G06N 20/00  (2019.01)

(52) U.S. Cl.
  CPC ............. *G06Q 20/20* (2013.01); *G06N 20/00* (2019.01); *G06Q 10/087* (2013.01); *G07F 7/08* (2013.01)

(58) Field of Classification Search
  CPC ...... G06Q 20/20; G06Q 10/087; G06N 20/00; G07F 7/08
  See application file for complete search history.

(56) References Cited

U.S. PATENT DOCUMENTS

| | | |
|---|---|---|
| 3,640,430 A | 2/1972 | Gordon |
| 4,922,435 A | 5/1990 | Cahlander et al. |
| 5,997,236 A | 12/1999 | Picioccio et al. |
| 6,279,718 B1 | 8/2001 | Nulph et al. |
| 6,725,889 B2 | 4/2004 | Perez Vales |

(Continued)

FOREIGN PATENT DOCUMENTS

| | | |
|---|---|---|
| CN | 2174743 | 8/1994 |
| CN | 202472798 | 10/2012 |

(Continued)

OTHER PUBLICATIONS

"Grocery Store Point of Sale, Supermarket POS, Specialty Foods Point of Sale," Rapid POS, 2019, 2 pages [retrieved online from: https://rapidpos.com/grocery-store-point-of-sale.php].

(Continued)

*Primary Examiner* — Florian M Zeender
*Assistant Examiner* — Joseph M Mutschler
(74) *Attorney, Agent, or Firm* — Sheridan Ross P.C.

(57) ABSTRACT

A system, server, and method are described. In an example, the server includes a distribution management instruction set that, when executed by a processor, monitor inventory levels of bulk consumable goods for dispensing systems at a plurality of different distribution locations. The server is also described to include one or more Artificial Intelligent (AI) models that operate in cooperation with the distribution management instruction set to enable the distribution management instruction set to predictively deploy physical distribution assets and to predictively ship bulk consumable goods to the plurality of different distribution locations based on the inventory levels of the bulk consumable goods monitored by the distribution management instruction set.

10 Claims, 14 Drawing Sheets

(56) References Cited

U.S. PATENT DOCUMENTS

| | | | |
|---|---|---|---|
| 7,343,719 | B2 | 3/2008 | Sus et al. |
| 8,239,268 | B2 | 8/2012 | Iizaka et al. |
| 8,473,098 | B2 | 6/2013 | Lock et al. |
| 8,739,293 | B2 | 5/2014 | Walker et al. |
| 8,880,427 | B1 | 11/2014 | Jones |
| 9,589,411 | B2 | 3/2017 | Shimmerlik et al. |
| 9,607,465 | B2 * | 3/2017 | Bruck .................. G07F 9/10 |
| 9,809,439 | B2 | 11/2017 | Falco, III |
| 2005/0171854 | A1 | 8/2005 | Lyon |
| 2007/0255450 | A1 | 11/2007 | Mazur et al. |
| 2010/0258581 | A1 | 10/2010 | Serrano |
| 2012/0199606 | A1 | 8/2012 | Gunstad et al. |
| 2013/0126042 | A1 | 5/2013 | Dewald et al. |
| 2014/0094959 | A1 | 4/2014 | Lock et al. |
| 2016/0018250 | A1 | 1/2016 | Sollazzo Lee et al. |
| 2016/0143456 | A1 | 5/2016 | Sirotovsky et al. |
| 2017/0186264 | A1 | 6/2017 | Bruck et al. |
| 2018/0068514 | A1 | 3/2018 | Li et al. |
| 2018/0218562 | A1 * | 8/2018 | Conway ............ G06Q 20/209 |

FOREIGN PATENT DOCUMENTS

| | | |
|---|---|---|
| CN | 104050531 | 9/2014 |
| CN | 105608795 | 5/2016 |
| CN | 205318529 | 6/2016 |
| CN | 106040338 | 10/2016 |
| CN | 107749119 | 3/2018 |
| CN | 108564722 | 9/2018 |
| CN | 108615302 | 10/2018 |
| CN | 109191692 | 1/2019 |
| EP | 1258845 | 11/2002 |
| EP | 1528016 | 5/2005 |
| EP | 2664552 | 5/2014 |
| EP | 1908351 | 3/2017 |
| EP | 2858043 | 1/2018 |
| JP | S64-3793 | 1/1989 |
| KR | 20-0339623 | 1/2004 |
| WO | WO-9909499 A1 * | 2/1999 ............ G07F 17/12 |
| WO | WO 2011/050799 | 5/2011 |
| WO | WO 2016/110672 | 7/2016 |

OTHER PUBLICATIONS

"Japanese Automatic Rice Grain Dispenser," Qoo10 Pte. Ltd., 2019, 17 pages [retrieved online from: https://www.qoo10.sg/item/Japanese-Automatic-Rice-Dispenser-Storage-8KG-12KG-Auto-Cup/431158039?stcode=77&_ar=Y].

"Smart[Bins] Hassle-free smart dispensers for grocery shoppers." smartbinstech, 2019, 3 pages [retrieved online May 31, 2019 from: https://www.smartbinstech.com/].

Ma "IoT—Enabled Fresh Rice Vending Machines Set to Woo Mainlanders," Hong Kong Trade Development Council, May 22, 2017, 2 pages [retrieved online from: http://economists-pick-research.hktdc.com/business-news/article/International-Market-News/IoT-Enabled-Fresh-Rice-Vending-Machines-Set-to-Woo-Mainlanders/imn/en/1/1X000000/1X0A9YVB.htm].

User gtsianak "GPAGD (General Purpose Automatic Grain Dispenser," MarketBot Industries, LLC, Jun. 9, 2018, 3 pages [retrieved online from: https://www.thingiverse.com/thing:2953499].

Ye "Fighting poverty in Hong Kong with a swipe of a card at a vending machine," South China Morning Post Publishers Ltd., Oct. 5, 2016, 4 pages [retrieved online from: https://www.scmp.com/print/news/hong-kong/education-community/article/2025348/fighting-poverty-hong-kong-swipe-card-vending].

* cited by examiner

CONSUMABLES DISPENSING SYSTEM AND METHOD

CROSS-REFERENCE TO RELATED APPLICATIONS

The present application is a Continuation-in-Part of U.S. patent application Ser. No. 16/502,028 filed on Jul. 3, 2019, the entire contents of which are incorporated herein by reference in their entirety.

FIELD OF THE DISCLOSURE

Embodiments of the present disclosure relate to dispensing systems and methods and, in particular, toward dispensing systems and methods for monitoring and controlling electro-mechanical storage, proportioning, and dispensing equipment for bulk consumable goods.

BACKGROUND

Although people have come a long way in becoming more mindful of our impact on the environment, the U.S. still produces over 250 million tons of trash each day which equates to over 4.4 pounds of trash per person per day, according to the most recent estimates from the Environmental Protection Agency (EPA).

While it's important for consumers to adopt more sustainable consumption habits, businesses are also responsible for assisting the change. For instance, changes to a company's supply chain infrastructure will likely empower conservation. In particular, the need to develop alternatives to the current packaging used in food and dry goods is critical.

Packaging is fundamental to manufacturers providing consumers around the globe with high-quality and safe food, drink, consumables, and other consumer products. Unfortunately, all the advances in packaging cannot continue to come at the expense of the environment. Even today's efforts to bring to market sustainable packaging still fall short and are unsustainable because they still are primarily linear. Raw materials are used to make packaging for a product, and after, or even before the product is consumed, the packaging is thrown away by the consumer. This model cannot continue and especially where plastics are used in the packaging systems.

There are actions being taken at the point of purchase level where supermarkets and specialty stores feature a small section of unpackaged goods. These include bulk foods, typically stored and presented to the consumer in bins or barrels, in which the consumer is permitted to select and package in any desired quantity. Access is often gained to the product by means of a hinged door or an open mouth to the bin. The consumer utilizes a scoop or cup to transfer the desired quantity from the barrel to a purchasing medium or receptacle, such as a plastic bag. Other dispensing types include gravity fed systems which allows bulk inventory stored in the bin to flow under the force of gravity into the consumer's container or bag. However, such systems increase the chance for contamination of the food and the resulting issues associated with food contamination and safety. In addition, in the scoop based bin system, the scoops ends up having food residue on them in addition to consumers actually having direct physical contact with the entire quantity of bulk product throughout the bin system thus posing a risk of contamination of the food. Just as critical is that a consumer is not prevented from returning dispensed food or product to the bin thereby enhancing the possibility of product contamination and all associated issues and risks associated with unsafe food storage and handling. The future of these dispensing systems is heading toward fully electro-mechanical based equipment that dispense exactly in the proportions a consumer may desire.

Unfortunately, the vast amount of food is still prepackaged in any number of endless configurations comprising many materials and combinations thereof such as foil, paper or plastics. The dispensing systems, although not without weaknesses and risks, all result in saving resources by reducing wasteful packaging. From the grocers and retailer's perspective, the systems positively impact the environment. Consumers are more than willing to utilize these dispensing systems as well, making dispensing systems a win-win situation for everyone involved, including our planet.

SUMMARY

As dispensing systems become more intelligent, the more valuable they are to the retailer due to inventory control needs and bottom line profits. The dispensing systems also become safer for the end consumer in the area of food safety.

The present disclosure relates, among other things to a smart electro-mechanical storage, proportioning, and dispensing systems for consumable products such as finished foods, dry foods such as grains, beans, rice, seeds, nuts, coffee, candies, granolas, cereals, rolled oats and pasta and pet foods such as cat and dog food, bird seed, and small bones. In addition, the present disclosure is contemplated to dispense any type of liquid and powder laundry detergents, soaps, softeners, and many other dry and liquid goods that currently are sold as pre-packaged boxed, bagged or bottled goods. It is also contemplated that the system can communicate with consumers and accept payment at a point-of-sale (POS) system.

Embodiments of the present disclosure will be described in connection with the intelligent and convenient distribution and dispensing of bulk consumable goods. A consumable good or bulk consumable good, as used herein, may include any number of different goods that are available for purchase and/or distribution. Specific, but non-limiting, examples of a consumable good or bulk consumable good include cereal, laundry detergent, wine, dog food, candy, pens, plant food, chips, snacks, water, soda, beer, dry goods, liquid goods, frozen goods, refrigerated goods, baked goods, cooked goods, coffee, crackers, nuts, pasta, pens, paper clips, screws, nails, over-the-counter health supplements and medications, combinations thereof, and the like. In other words, embodiments of the present disclosure are not intended to be limited to any particular type of good or combination of goods.

Embodiments of the present disclosure contemplate an electro-mechanical smart system to store, portion, and dispense consumable items ranging from dry food, detergents, and liquids to a consumer on an individual basis at a point of purchase or retailer.

In addition to the reduction in reducing packaging that goes into the selling of products, the need is present to make sure that products are always available on the shelf when the customer is shopping for them. Unfortunately, many brands have a challenge associated with out-of-stocks, products not available to buy in a store because they have all been sold or not on the shelf to sell. A 2018 retail study funded by The Proctor & Gamble Company and titled, Retail Out-of-Stocks: A Worldwide Examination of Extent, Causes and Consumer Responses, revealed that the average out-of-stock rate in the US is close to 8 percent and up to 15 percent for advertised sale items. Worldwide, shoppers experience $984 billion worth of out-of-stocks, $144.9 billion in North America alone, according to the IHL Group, a global research and advisory firm specializing in technologies for the retail and hospitality industries. Worse yet, ongoing occurrences of out-of-stock items result in consumer frustrations and brand reputation degradation and loyalty.

While shelf level inventory data must be accurate to be of any value, it can only provide data on how much of a product should be on the shelf. The question remains, "what happens to instances of products that might be misplaced or carried from one part of a store and dropped off on a shelf unrelated to the product's 'inventoried' shelf?" Moreover, items that have been shoplifted, fraudulently returned, or subject to administrative error may not be inventoried accurately. The only way to account for these issues is through auditing.

Reducing out-of-stocks is a complex challenge but one that is addressed by embodiments of the present disclosure by way of real-time inventory monitoring, control and reporting data on dispensing equipment. Product cannot be "lost" by walking off or being misplaced on other shelves. The inventory is adjusted only after being dispensed purposely by the automated system.

In some embodiments, the dispensing system is contemplated to include, without limitation, any number of systems and sub-systems such as: storage and dispensing components/mechanicals; portioning mechanisms and controllers; cold storage; heated storage; wet storage; dry storage; a secure system that allows only preset portions of volume or weight to be dispensed at one time; a connected control server that monitors and controls the dispensing system through wired or wireless connectivity to local and/or cloud-based processing and control; a system that recognizes the consumer the goods are being dispensed or have just been dispensed to expedite the sales/checkout process; a system that can accept payment (e.g., credit card, electronic, and wireless) from the consumer at point of dispensing; a system that can print out a machine-readable receipt with information for register or consumer on total cost price and other defining information for the dispensed good(s); a display screen for displaying POS information, branding information, and other information to the consumer; a display screen that enables customer interaction, one-way or two-way, with a customer service representative that is either remotely located with respect to the customer or in the same building as the customer; audio hardware components to facilitate customer interactions with a customer service representative; a biometric recognition system to expedite payment or other transactions and/or communications; a reporting system to email transaction and or purchase information to the customer; a main control server to coordinate operations of multiple dispensing systems and multiple distribution locations; a mobile dispensing system that is enabled, possibly via Artificial Intelligence (AI) to roam throughout a physical space to offer and dispense goods to a customer; a pricing system that is configured to facilitate on the fly pricing changes for consumable goods, where the price adjustments can be made to one or more dispensing systems in one or more distribution locations and at any time from the central control server; a smart dispensing system that is monitored wirelessly and or via a wired connection for inventory levels of the goods being dispensed; a smart dispensing system that sends alerts and reports in real-time to a centralized inventory management entity on inventory shortages and status in one or more individual dispensing units in one or more different geographic locations; a smart system that weighs portions dispensed and shows weight of dispensed goods to consumer on the digital screen and or a printed out on a receipt; a system that detects people walking by the dispensing systems so an audible and or video is shown to attract them to the dispensing unit; and/or a shelf inventory monitoring system deployed at each point of dispensing that is integrated into a retailer's POS system.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as X1-Xn, Y1-Ym, and Z1-Zo, the phrase is intended to refer to a single element selected from X, Y, and Z, a combination of elements selected from the same class (e.g., X1 and X2) as well as a combination of elements selected from two or more classes (e.g., Y1 and Zo).

The term "a" or "an" entity may refer to one or more of that entity. As such, the terms "a" (or "an"), "one or more" and "at least one" can be used interchangeably herein. It is also to be noted that the terms "comprising", "including", and "having" can be used interchangeably.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

BRIEF DESCRIPTION OF THE DRAWINGS

The present disclosure is described in conjunction with the appended figures, which are not necessarily drawn to scale.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting.

Figure 1:
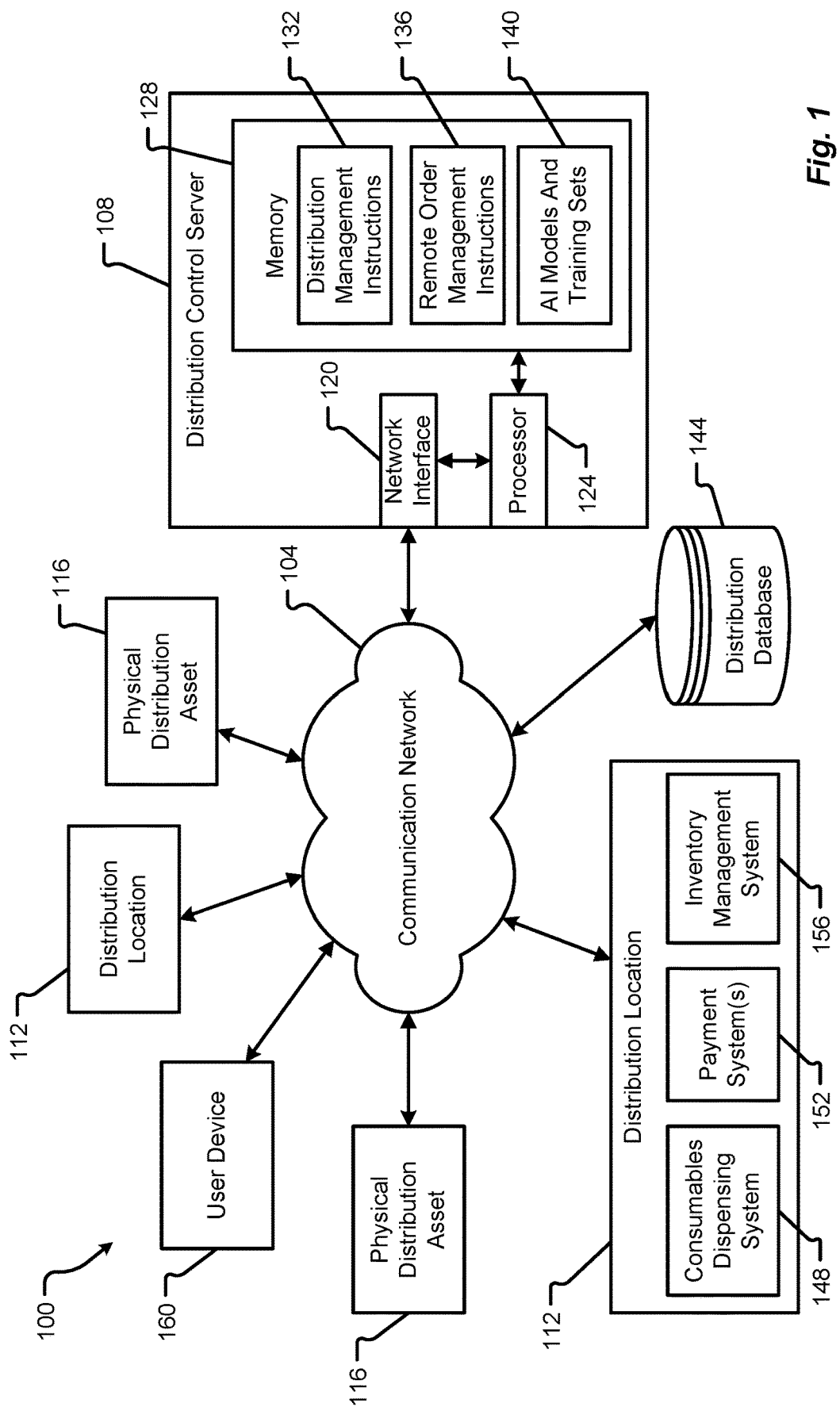
FIG. 1 is a block diagram depicting a system in accordance with at least some embodiments of the present disclosure.

With reference initially to FIG. 1, a system 100 used for the distribution and management of multiple dispensing systems will be described in accordance with at least some embodiments of the present disclosure. The system 100 is shown to include a communication network 104 that enables electronic communications between a distribution control server 108 and a number of other communication nodes in the system 100. The other nodes that may be monitored and controlled by the distribution control server 108 include, without limitation, distribution locations 112 and assets as distribution locations 112, physical distribution assets 116, user devices 160, and a distribution database 144. In some embodiments, the distribution control server 108 may be configured to monitor a level of inventory for various consumable goods available for purchase and/or distribution at the various distribution locations 112. As inventory levels for particular goods at a distribution location 112 fall below a predetermined (or programmable) threshold the distribution control server 108 may alert and dispatch certain physical distribution assets 116 to deliver more goods to the affected distribution location 112. In some embodiments, a physical distribution asset 116 may correspond to a delivery truck, a communication device carried by a driver of a delivery truck, or a distribution facility in a predetermined location that has multiple delivery trucks and/or drivers. The physical distribution asset 116 may be responsible for physically delivering consumable goods to a distribution location 112, which may correspond to a retail store or other physical location where a customer is able to purchase and/or pick up bulk consumable goods, perhaps among other goods.

Each distribution location 112 may include, one, two, or many dispensing systems 148 that physically store and distribute consumable goods to a customer. In some embodiments, a distribution location 112 may also include one or more payment systems 152 and an inventory management system 156. The payment systems 152 may include one or more POS terminals, one or more hand-held terminals, or the like that are connected to a payment management server, which may be provided at the distribution location or at a centralized location, such as the location also housing the distribution control server 108. The inventory management system 156 may be configured to manage the inventory of goods at the particular distribution location. The inventory management system 156 may be in communication with the dispensing system 148 to determine an amount of inventory for each of the goods being distributed by the dispensing system 148, when additional goods are dispensed by the dispensing system 148, and/or when a particular amount of a good is below a particular threshold. The inventory management system 156 may also be configured to communicate with the distribution control server 108 to report various states of the goods at the distribution location 112, thereby enabling the distribution control server 108 to know when additional good(s) of a particular type need to be distributed to the distribution location 112 via the physical distribution assets 116. Alternatively, or additionally, inventory information from the inventory management system 156 may be reported or uploaded to a distribution database 144 and then the distribution control server 108 may run regular or periodic queries against the distribution database 144 to determine whether and when additional goods should be distributed to a distribution location 112. The distribution database 144 may be provided in any type of known or yet-to-be-developed database format. For instance, the distribution database 144 may include a SQL database, a noSQL database, a relational database, a graph database, a distributed ledger, a real-time database, or a combination thereof.

The communication network 104 may be configured to provide machine-to-machine communication capabilities. The various components of the system 100 may be in wired and/or wireless communication via the communication network 104. In some embodiments, the user device 160 may correspond to any type of computing and/or communication device. Examples of a user device 160 include, without limitation, a cellular phone, a portable smartphone, a tablet, a wearable device, a Personal Computer (PC), a POS terminal, or the like. In some embodiments, the user device 160 may be used to place remote orders for goods that can be processed by the distribution control server 108 and then fulfilled, either by the customer or a representative thereof, at the distribution location 112.

The communication network 104 may correspond to any known type of network that facilitates machine-to-machine communications as noted above. The communication network 104 may use the same communication protocols or different protocols without departing from the scope of the present disclosure. In some embodiments, the devices connected with the communication network 104 may be configured to communicate using various nodes or components of the communication network 104. The communication network 104 may correspond to one or many different networks, and may also comprise any type of known communication medium or collection of communication media and may use any type of protocols to transport messages between endpoints. The communication network 104 may include wired and/or wireless communication technologies. The Internet is an example of a communication network 104 that constitutes an Internet Protocol (IP) network consisting of many computers, computing networks, and other communication devices located all over the world, which are connected through many telephone systems and other means. Other examples of a communication network include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over Internet Protocol (VoIP) network, an ad-hoc communication network, a cellular network, and any other type of packet-switched or circuit-switched network known in the art. In addition, it can be appreciated that the communication network 104 need not be limited to any one network type, and instead may be comprised of a number of different networks and/or network types. Moreover, the communication network 104 may include a number of different communication media such as coaxial cable, copper cable/wire, fiber-optic cable, antennas for transmitting/receiving wireless messages, and combinations thereof.

The distribution control server 108, although depicted as a single server, may correspond to one or many servers deployed in a single location or in multiple different locations. In some embodiments, the distribution control server 108 or the components thereof may be implemented as a cloud-based server architecture whereby multiple different servers coordinate with one another to provide functionality described in connection with the distribution control server 108.

In some embodiments, the distribution control server 108 may include a network interface 120, a processor 124, and computer memory 128. The memory 128 may be configured to stored executable instruction sets that enable functionality of the server 108. Non-limiting examples of the instruction sets include a distribution management instruction set 132 and a remote order management instruction set 136. Each of the instruction sets may be executable by the processor 124. In addition to storing one or more discrete instruction sets having defined inputs and outputs in response to predetermined conditions, the server 128 may also utilize one or more AI models and/or machine-learning training data sets 140 to help enable intelligent/dynamically responsive functionality of the distribution control server 108. In some embodiments, the AI models and/or training data sets 140 may be stored as one or more data files and may be implemented as one or more neural networks in which inputs are provided to the neural network, which processes the inputs to produce an output or set of outputs based on the inputs provided. In some embodiments, the AI models may operate on real-time distribution data received from the distribution database 144. Training data sets, on the other hand, may be used to train the AI model files and, as additional data is added to the distribution database 144 and confirmed as valid data, the training sets may be updated. As training data sets are updated with additional validated data, the AI models may be retrained and/or tested against the other types of AI models to determine if the currently-used AI models are still valid, should have one or more coefficients updated, or be replaced with a different AI model.

The instruction sets of the server 108 may enable functionality of the server 108 and/or system 100 as will be described herein. As discussed above, the memory 108 may correspond to a computer-readable storage medium that is configured to store a number of processor-executable instruction sets (e.g., in the form of the distribution management instruction set 132 and/or remote order management instruction set 136). It should be appreciated that any of the instruction sets depicted and described herein may be implemented as one or more AI model files. Alternatively, or additionally, any of the AI functionality depicted and described herein may be implemented as a discrete instruction set without departing from the scope of the present disclosure.

The distribution management instruction set 132, when executed by the processor 124, may enable the distribution control server 108 to perform all of the functions necessary to track, report, and manage the distribution of goods among the various distribution locations 112. In some embodiments, the distribution management instruction set 128 may be configured to track inventory levels of all consumable dispensing systems 148, track orders for goods and predict whether those orders will result in a need for further distribution instructions, respond to inventory requests from the inventory management systems 156 of the various distribution locations 112, and coordinate delivery of goods via interactions with the physical distribution assets 116. It should be appreciated that many of the distribution and inventory control functions depicted and described herein may be performed by the distribution management instruction set 132 or a subroutine thereof.

The remote order management instruction set 136, when executed by the processor 124, may enable the distribution control server 108 to offer and respond to remote orders placed by a customer at a user device 160. In some embodiments, the remote order management instruction set 136 may present a web-based interface (e.g., a website or ordering portal) to the user device 160 and enable the customer to place an order for goods via the web-based interface. The orders received at the remote order management instruction set 136 may be communicated to appropriate distribution locations 112 to enable those locations to either fulfill the order on behalf of the customer or enable the distribution location 112 to be prepared for the customer (or a representative thereof) to visit the dispensing system 148 at that particular distribution location 112 and receive the ordered goods.

The AI models 140 may enable the distribution control server 108 to monitor customer behaviors relative to various distribution locations, check inventory levels, and determine whether and when distribution instructions should be sent (e.g., to the physical distribution assets). The AI models 140 may also be configured with intelligence to predict when an order or multiple orders are likely to be placed (e.g., based on seasonal trends, historical trends, price fluctuations, predicted customer behavior, etc.) and then proactively distribute goods to particular distribution locations 112 in response to such predictions. The AI models 140 may also be configured to assist the dispensing systems 148 to intelligently respond to customer requests and facilitate automated customer service interactions at the dispensing systems 148.

Figure 2:
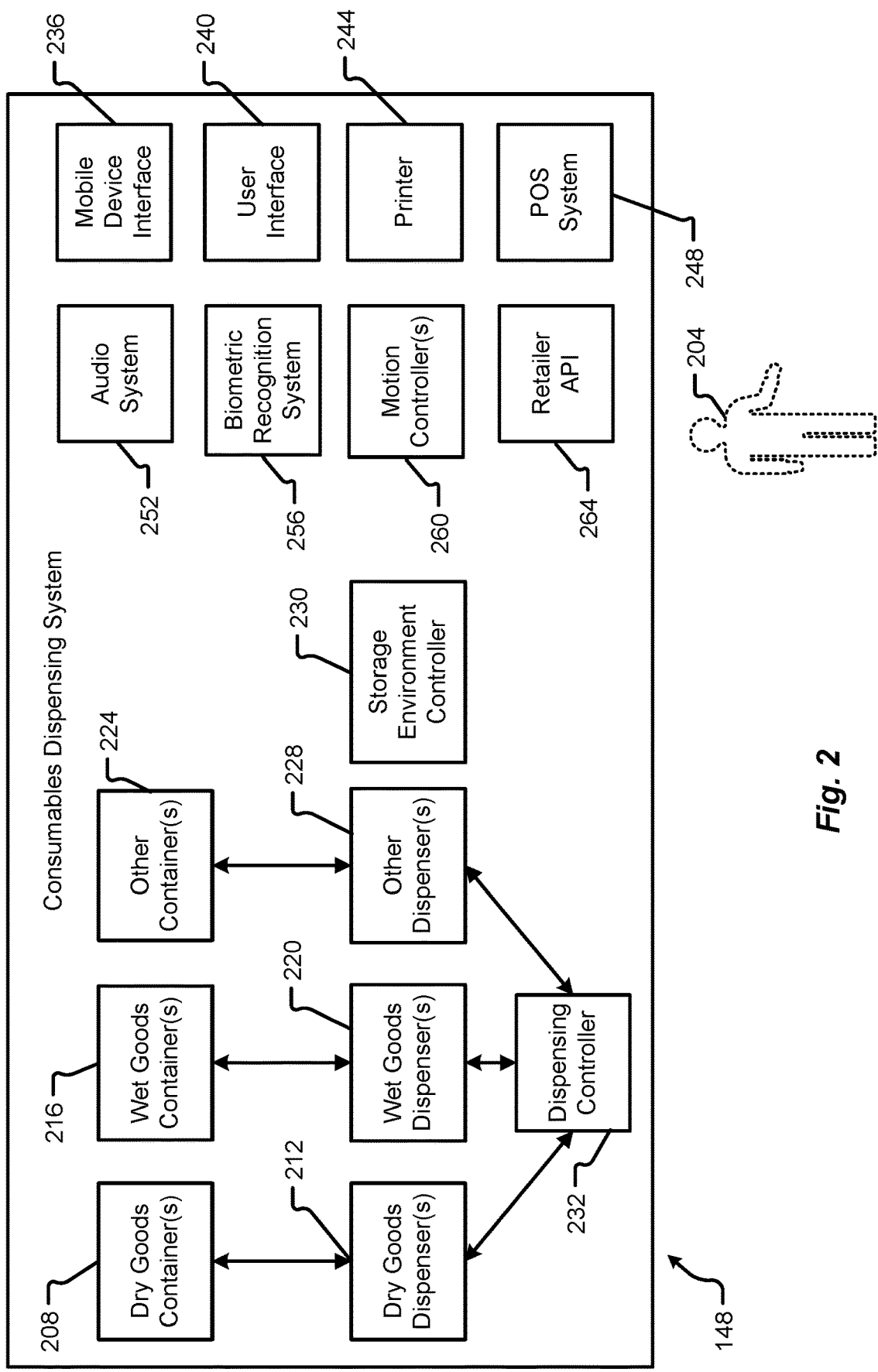
FIG. 2 is a block diagram depicting a consumables dispensing system in accordance with at least some embodiments of the present disclosure.

With reference now to FIG. 2, additional details of the dispensing system 148 will be described in accordance with at least some embodiments of the present disclosure. The dispensing system may correspond to one or many physical systems deployed at a distribution location 112. In some embodiments, the dispensing systems 148 may include hardware and software components that facilitate the dispensing of bulk consumable goods of one or multiple different types. The dispensing system 148, in some embodiments, may be configured to respond to remotely-placed orders (e.g., orders placed by a customer 204 at a user device 160) and/or in-person orders where the customer 204 is physically present in front of the hardware of the dispensing system 148.

The dispensing system 148 may include, without limitation, one or more dry goods containers 208, one or more dry goods dispensers 212, one or more wet goods containers 216, one or more wet goods dispensers 220, one or more other containers 224, one or more other dispensers 228, a storage environment controller 230, and one or more dispensing controllers 232. It should be appreciated that the dispensing system 148 may include one or many of the different types of containers, dispensers, and/or controllers. It should also be appreciated that the storage environment controller 230 and the functionality thereof may depend upon the types of goods being contained and dispensed by the dispensing system 148. For instance, if the dispensing system 148 is configured to contain and dispense liquids that require refrigeration, then the storage environment controller 230 may include one or more refrigeration control units to appropriately adjust and control a temperature of the containers and dispensers used for the liquids requiring refrigeration. As another example, if the dispensing system 148 is configured to contain and dispense hot goods or baked/cooked goods, then the storage environment controller 230 may be configured to control one or more heating units used for the heating of the goods. In some embodiments, the storage environment controller 230 may be configured to report back to the distribution control server 108 regarding a current environmental status of the various containers 208, 216, 224. For instance, if a temperature or humidity of a particular container 208, 216, 224 falls outside of a predetermined and required temperature or humidity, then the storage environment controller 230 may generate an alert or reporting message for transmission across the communication network 104 to the distribution control server 108 and/or to a designated user device or work station of a predetermined retail employee to assist with manual servicing of the dispensing system 148. In some embodiments, the storage environment controller 230 may cooperate with the dispensing controller 232 to instruct the dispensing controller 232 to initiate or perform a self-cleaning process for one or more of the containers 208, 216, 224 and/or dispensers 212, 220, 228. In this way, the storage environment controller 230 may effect a self-cleaning routine, thereby ensuring that the various mechanical components of the dispensing system 148 remain in a suitably clean condition. In some embodiments, the storage environment controller 230 may automatically reset or change the input to some environmental condition (e.g., temperature, humidity, pressure, etc.) to bring it to the preset and specified condition for a container or dispenser. Additional details of hardware components that may be used for the containers, dispensers, storage environment controller 230, and/or dispensing controller 232 are described in one or more of the following: U.S. Pat. Nos. 4,922,435; 6,725,889; 8,473,098; U.S. Patent Publication No. 2007/0255450; U.S. Publication No. 2008/0068514; and U.S. Patent Publication No. 2018/0218562, each of which are hereby incorporated herein by reference in their entirety.

It should be appreciated that the dispensing system 148 may include one or multiple dispensing controllers 232. In some embodiments, a single controller 232 may be suitable to control the mechanical components of the dispensers such that an appropriate and measured amount of the corresponding good is distributed. Alternatively, each individual dispensing device may have a dedicated dispensing controller 232, which may be particularly configured to control the hardware components of that particular dispensing device. In the latter architecture, the various dispensing controllers 232 may be connected and responsive to a master controller that provides individual dispensing instructions to each of the various dispensing controllers 232. Additional details of a dispensing controller 232 will be described in connection with FIG. 3.

The dispensing system 148 may also be configured to include a number of other components that facilitate a friendly and efficient experience for the customer 204. For instance, the dispensing system 148 may include a mobile device interface 236, a user interface 240, a printer 244, a POS system 248, an audio system 252, a biometric recognition system 256, one or more motion controllers 260, and a retailer API 264.

The mobile device interface 236 may include hardware and software that facilitates interactions with a customer's 204 mobile device. For instance, the mobile device interface 236 may facilitate interactions with a customer's mobile device for purposes of enabling payment with a mobile wallet. In such a situation, the mobile device interface 236 may include an NFC antenna and driver as well as software that facilitates a secure and authenticated interaction with the mobile device. The mobile device interface 236 may alternatively or additionally include a Bluetooth® interface, a WiFi interface, an optical recognition interface (e.g., a sensor and driver that optically reads and recognizes printed codes in the form of a barcode or QR code).

The user interface 240 may or may not include one or more input devices and/or display devices. Examples of suitable user input devices that may be provided in the user interface 240 include, without limitation, buttons, keyboards, mouse, touch-sensitive surfaces, pen, camera, microphone, body-worn sensors, heart rate monitors, body position monitors, blood oxygen monitors, hydration monitors, body temperature monitors, altimeters, etc. Examples of suitable user output devices that may be provided in the user interface 240 include, without limitation, display screens, touchscreens, lights, speakers, etc. It should be appreciated that the user interface 240 may also include a combined user input and user output device, such as a touch-sensitive display or the like.

The printer 244 may correspond to any type of printing device used to print receipts, labels, tags, or the like. In some embodiments, the printer 244 may print tags for adhesion to bags that have a consumable good dispensed therein. The information printed on the tag by the printer 244 may include information describing the type of good, the amount of good dispensed by the dispensing system 148, and/or a price associated with the amount of the good dispensed by the dispensing system 148. Alternatively, or additionally, if the customer 204 pays for the good ahead of time (either via the POS system 248 or via a remote order), the printer 244 may be used to print a receipt for the goods, once dispensed, thereby providing a proof of purchase for the customer 204.

The POS system 248 may operate in cooperation with the printer 244 and other components of the dispensing system 148. In some embodiments, the POS system 248 may be configured to accept payments directly from a customer 204 either via a credit card, cash, coin, mobile wallet, etc. Alternatively, or additionally, the POS system 248 may be configured to cooperate with the mobile device interface 236 to accept payments from a customer's 204 mobile device. Alternatively, or additionally, the POS system 248 may be configured to interact with the remote order management instruction set 136 to determine whether or not a customer 204 has previously paid for an order online and whether all goods listed in the order have been dispensed by the dispensing system 148.

The audio system 252 may correspond to a part of the user interface 240 or may correspond to a separate set of hardware and/or software that enables the customer 204 to interact with the dispensing system 148 in an audible manner. For instance, the audio system 252 may include speakers, microphones, etc. In some embodiments, as will be discussed in further detail herein, the audio system 252 and/or user interface 240 may be used by an operator of the distribution location to enable a customer service representative to provide the customer 204 with help via the dispensing system 148. In other words, the customer 204 may be allowed to request and receive help from a human customer service representative regardless of whether or not the customer service representative is physically located in the same location as the customer 204. Rather, the hardware and/or software of the dispensing system 148 can be used to facilitate remote customer service sessions that help the customer 204 have their various issues satisfied.

In some embodiments, the user interface 240 and/or audio system 252 may be configured to display information on behalf of the POS system 248, display branding information provided by a retailer via the retailer API 264, and/or other information. In some embodiments, the user interface 240 and/or audio system 252 may be invoked to present attraction messages to a user 204 when it is detected that the user 204 is passing within a predetermined proximity of the dispensing system 148. For instance, the user interface 240 and/or audio system 252 may be configured to present a visible and/or audible attraction message in response to a proximity sensor detecting a presence of the user 204, in response to the user's mobile device pairing with the mobile device interface 236, and/or in response to any other sensor input that detects the presence of the user 204 nearby the dispensing system 148. As will be discussed herein, the hardware components of the user interface 240 and/or audio system 252 may be configured to provide multiple different types of content and may further be configured to adjust their interaction with the user 204 based on whether or not the user 204 is a recognized user 204 and based on what stage of a purchase process the user 204 is currently having with the dispensing system 148.

The biometric recognition system 256 may correspond to hardware and/or software that enables the dispensing system 148 to capture and recognize various biometric features of the customer 204. For instance, the biometric recognition system 256 may include a camera and facial recognition software used to determine whether the customer 204 corresponds to a particular user (e.g., based on a comparison of the customer's 204 facial features with one or more templates describing facial features of enrolled and known customers). In some embodiments, the biometric recognition system 256 may include a fingerprint sensor or scanner and associated software that is configured to detect certain features from the customer's 204 fingerprint and determine if the features match any fingerprint features (e.g., as stored in a fingerprint template) of enrolled and known customers. As can be appreciated, it may be useful and convenient to the customer 204 to capture biometric information about the user, compare the biometric information against registered biometric information for the user and/or associated with an already-placed order, and then begin automatically fulfilling the order if a match is determined by dispensing the various goods identified in the order. Such a system may create a relatively frictionless experience for the customer 204 when purchasing bulk consumable goods.

The motion controller(s) 260 may correspond to hardware and/or software (or AI components) that enable the dispensing system 148 to physically move about a physical area (e.g., throughout a distribution location 112). In some embodiments, the motion controller(s) 260 may be configured to enable the dispensing system 148 to roam about a physical location and interact with customers 204 on a proactive basis (e.g., without requiring the customer 204 to physically walk into proximity of a fixed position dispensing system 148). In this way, the dispensing system 148 can seek out customers 204 and offer goods for purchase to the customer 204.

The retailer API 264 may correspond to a set of interfaces that enable a retailer or operator of a distribution location 112 to modify or customize various aspects of the dispensing system 148. In some embodiments, the retailer API 264 may expose options to an operator of the distribution location 112 that allow the operator to identify what types of goods have been placed in certain containers, prices associated with those goods, holding temperatures or humidity for the goods, branding/advertising desired for the goods, and other features that the operator may wish to customize. The retailer API 264 may also provide the communication interfaces to enable a customer service representative to establish a communication session with the customer 204 using hardware of the dispensing system 148. Moreover, the retailer API 264 may provide an interface for troubleshooting or diagnosing issues associated with various hardware components of the dispensing system 148.

Figure 3:
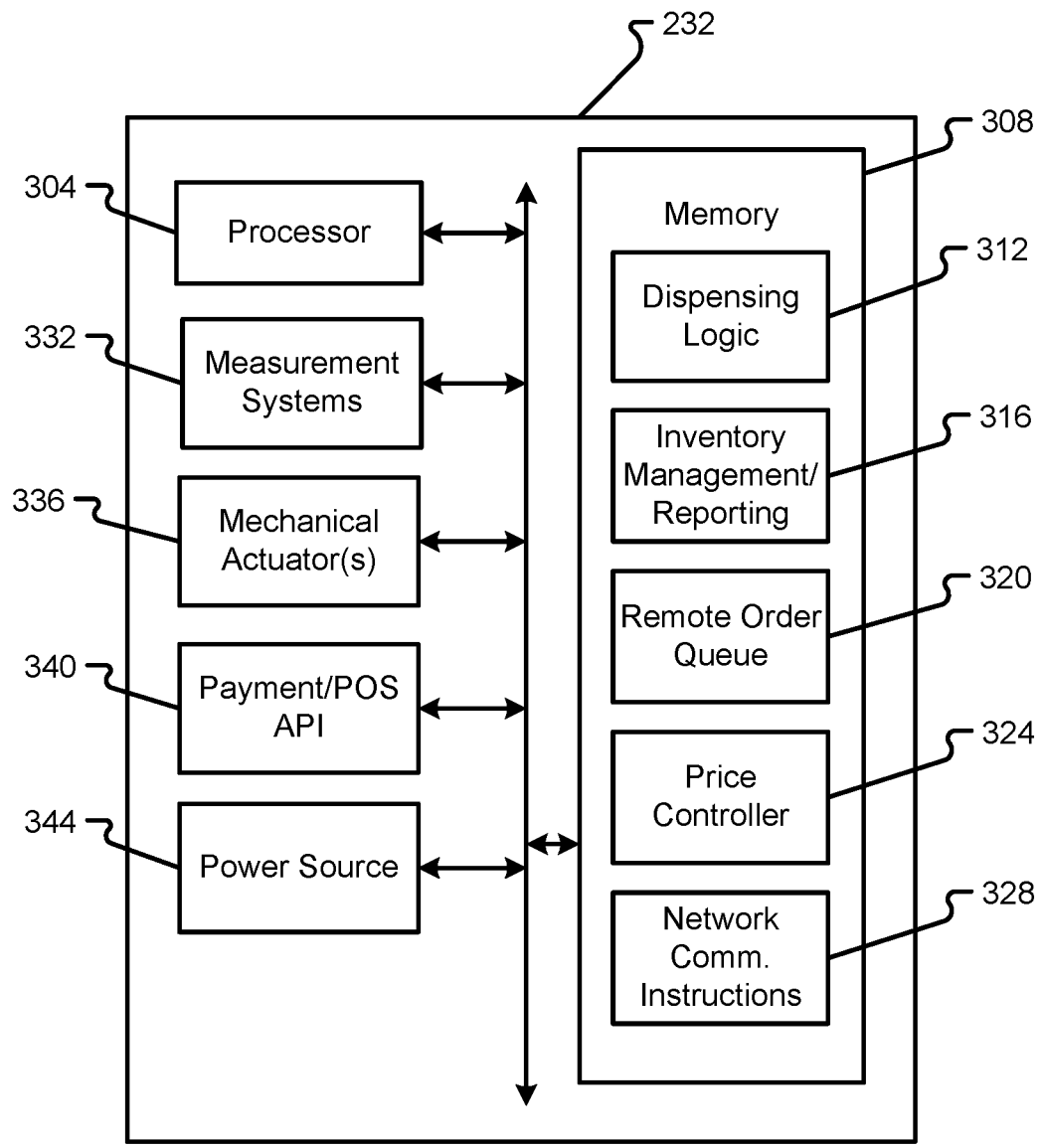
FIG. 3 is a diagram depicting a dispensing controller in accordance with at least some embodiments of the present disclosure.

With reference now to FIG. 3, additional details of the dispensing controller 232 will be described in accordance with at least some embodiments of the present disclosure. The dispensing controller 232 is shown to include a processor 304, memory 308, measurement systems 332, mechanical actuator(s) 336, a payment/POS API 340, and a power source 344.

The memory 308 of the dispensing controller 232 may be used to store instructions that enable functionality of the dispensing controller 232 when executed by the processor 304. Alternatively, or additionally, the memory 308 may be used for the temporary or long-term storage of program instructions and/or data. The memory 308 may contain executable instructions that are used by the processor 304 to run other components of dispensing system 148. In one embodiment, the memory 308 may be configured to store some or all information that enables functionality of the dispensing system 148. Non-limiting examples of instruction sets that may be stored in memory 308 include dispensing logic 312, an inventory management/reporting instruction set 316, a remote order queue 320, a price controller 324, and a network communication instruction set 328.

The dispensing logic 312, when executed by the processor 304, may enable the dispensing controller 232 to determine an amount and type of good to be dispensed and, in some embodiments, may actuate one or more of the dispensers 212, 220, 228 according to the type of good to be dispensed. The dispensing logic 312 may also be configured to meter the amounts of a good dispensed in accordance with an amount identified in an order, an amount identified by a user 204, an amount of the good remaining in the corresponding container, or combinations thereof. Furthermore, the dispensing logic 312 may be configured to report an amount of a good actually dispensed to the POS system 248 and/or printer 244, thereby enabling the POS system 248 to register the amount of the good dispensed and/or enabling the printer 244 to print information associated with the amount of the good dispensed. In some embodiments, the dispensing logic 312 may utilize the payment/POS API 340 as a mechanism for communicating with the POS system 248.

The inventory management/reporting instruction set 316, when executed by the processor 304, may enable the dispensing controller 232 to track inventory levels of goods maintained in the various container(s) 208, 216, 224 and track when quantities of those goods are dispensed by the dispensing system 148. The inventory management/reporting instruction set 316 may also be configured to determine if any particular inventory level of a good has fallen below a predetermined threshold and, if so, report such an event back to the distribution management instruction set 132 at the distribution control server 108. In some embodiments, the inventory management/reporting instruction set 316 may be configured to act as the local node for tracking and determining amounts of goods within the dispensing system 148 at any given time. The inventory management/reporting instruction set 316 may also be responsive to inventory queries issued by the distribution management instruction set 132 and report all levels of goods in the containers 208, 216, 224 at a given time. The inventory management/ reporting instruction set 316 may be configured to utilize the network communication instruction set 328 to facilitate communications over the communication network 104 with the distribution control server 108. In some embodiments, the network communication instruction set 328 may be used to generate and send one or more reporting messages (e.g., data packets, emails, reports, status signals, etc.) over the communication network 104 to the distribution control server 108 on behalf of the inventory management/reporting instruction set 316.

The remote order queue 320 may correspond to a logical queue of orders placed by a user device 160 with the remote order management instruction set 136. In some embodiments, the remote order queue 320 may include a list of remote orders placed by a user 204 including a listing of goods by type, price, and quantity. When a user 204 places an order with the remote order management instruction set 136, the details of the order may be provided to a particular distribution location 148 and dispensing controller 232 at that particular distribution location 148. The controller 232, upon receiving the details of the remote order, may store the order information (e.g., listing of ordered goods along with their corresponding type, price, and quantity). The order information may be stored by the dispensing controller 232 in the remote order queue 320 until the user 204 (or a representative thereof) is physically present at the dispensing system 148 and requests the dispensing system 148 to fulfill the remote order. The dispensing logic 312 may then retrieve the appropriate order for the user 204 from the remote order queue 320 and then dispense the appropriate amount of goods based on the information contained in the remote order queue 320.

In some embodiments, the dispensing system 148 could also dispense the remotely ordered goods in a container, provided by the distribution location 112 where such dispensing system 148 is located. The ordering user (or a representative thereof) may pick up the container holding the goods from a different location 112 or the same location 112 where the order was fulfilled, at some later time.

The price controller 324 may be used to dynamically adjust prices of goods contained in the dispensing system 148. In some embodiments, the price controller 324 may be responsive to price adjustment instructions received from the distribution control server 108 and, when such instructions are received, dynamically adjust the prices displayed for and applied to various goods offered for sale at the dispensing system 148. The price controller 324 may also communicate with the POS system 248 via the payment/ POS API to inform the POS system 248 of price adjustments made at the dispensing system 148. In this way, the POS system 248 can be made aware of price adjustments made by the price controller 324 and/or distribution control server 108 immediately without requiring any user action. This makes adjusting prices of bulk consumable goods more efficient and less time consuming for the retailer operating the dispensing system 148.

The measurement systems 332 may include one or more many sensors used by the dispensing logic 312 to determine an amount of a good dispensed by a dispenser 212, 220, 228. The sensors that are included in the measurement systems 332 may include, without limitation, weight sensors, optical sensors, fluid flow sensors, object counters, or any other transducer capable of determining an amount of a good dispensed by a particular dispenser 212, 220, 228. It should be appreciated that the nature of the sensor(s) in the measurement system 332 may vary depending upon the type of good being dispensed. Moreover, the measurement systems 332 may also be used to ensure that an amount of a good dispensed corresponds to the amount of the good purchased. Thus, the dispensing logic 312 may utilize the measurement systems 332 to ensure that accurate amounts of goods are dispensed by the various dispensers 212, 220, 228.

The mechanical actuator(s) 336 may correspond to the mechanical controls used to physically operate the various dispensers 212, 220, 228. In some embodiments, the mechanical actuator(s) 336 may include one or more server motors, fluid pumps, control valves, or the like that are configured to enable the dispensers 212, 220, 228 to dispense an amount of a good from the corresponding container 208, 216, 224. In some embodiments, the dispensing logic 312 may operate the mechanical actuator(s) 336 and use the measurement systems 332 to determine whether and when to stop operating the mechanical actuator(s) 336.

The processor 408 may correspond to one or many microprocessors that are contained within the housing of the communication device 108 with the memory 404. In some embodiments, the processor 408 incorporates the functions of the user device's Central Processing Unit (CPU) on a single Integrated Circuit (IC) or a few IC chips. The processor 408 may be a multipurpose, programmable device that accepts digital data as input, processes the digital data according to instructions stored in its internal memory, and provides results as output. The processor 408 implements sequential digital logic as it has internal memory. As with most known microprocessors, the processor 408 may operate on numbers and symbols represented in the binary numeral system.

As mentioned above, the dispensing controller 232 may include a power source 344. The power source 344 may be configured to provide power to the parts of dispensing controller 232 for operational purposes. For example, the power source 344 may include a battery or other power source to supply power to parts of the dispensing controller 232. The power source 344 may include a built-in power supply (e.g., battery) and/or a power converter that facilitates the conversion of externally-supplied AC power into DC power that is used to power the various components of the dispensing controller 232. In some embodiments, the power source 344 may also include some implementation of surge protection circuitry to protect the components of the dispensing controller 232 from power surges.

Although not depicted, the dispensing controller 232 may include a network interface that comprises hardware to facilitate communications with other communication devices over the communication network 104. The network interface may include an Ethernet port, a Wi-Fi card, a Network Interface Card (NIC), a cellular interface (e.g., antenna, filters, and associated circuitry), or the like. The network interface, in some embodiments, may be configured to facilitate a connection between the dispensing system 148 and the communication network 104 and may further be configured to encode and decode communications (e.g., packets) according to a protocol utilized by the communication network 104.

Figure 4:
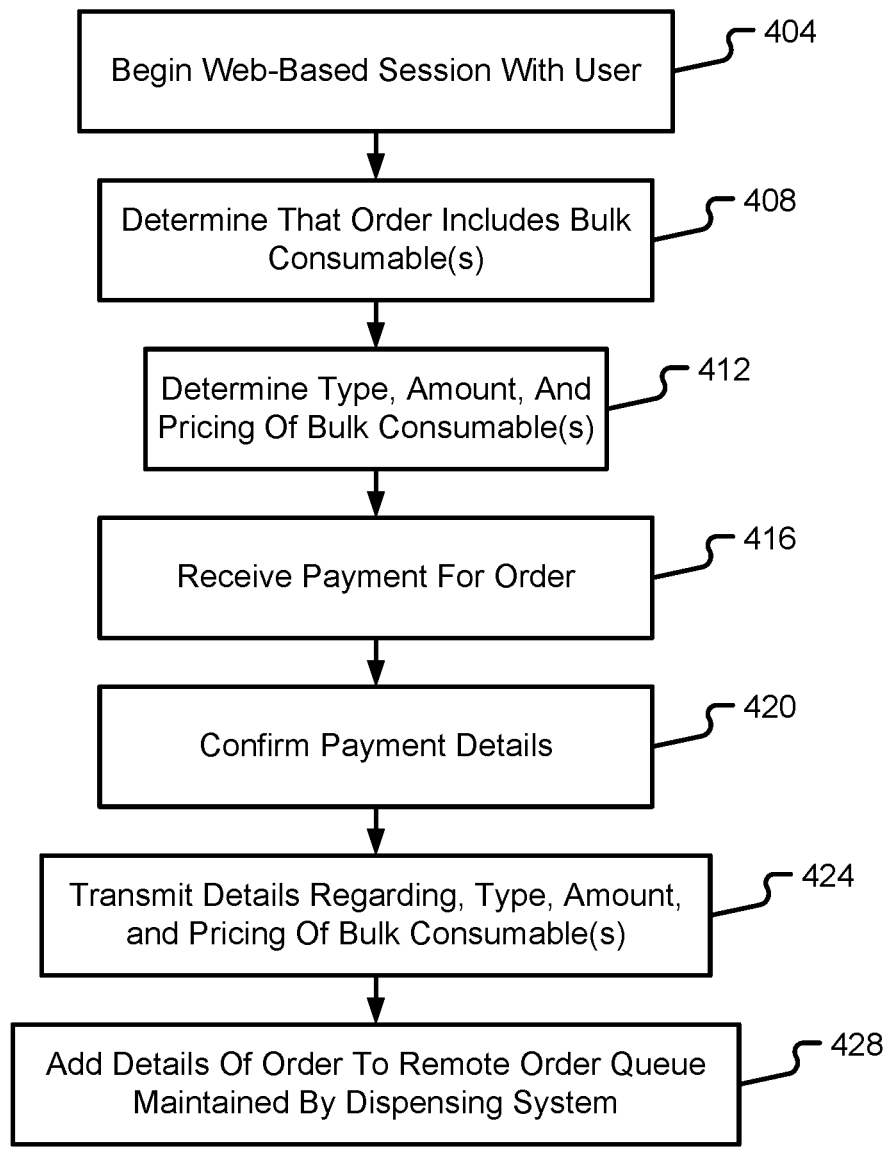
FIG. 4 is a flow diagram depicting a remote ordering method in accordance with at least some embodiments of the present disclosure.

With reference now to FIG. 4, a method of enabling a user 204 to place a remote order with a user device 160 for bulk consumable goods will be described in accordance with at least some embodiments of the present disclosure. The method begins by enabling the user 204 to engage in a web-based session with the distribution control server 108 (step 404). In some embodiments, the user device 160 is presented with one or more pages (e.g., html pages, mobile web pages, etc.) that enable the user 204 to place an order for one or more goods with the remote order management instruction set 136.

The method continues by determining that the user's 204 order includes one or more bulk consumable goods (step 408). The type, amount, and pricing associated with each bulk consumable good is determined (step 412) by the remote order management instruction set 136 and added to a shopping cart or the like for the user's 204 order.

The method then continues by prompting the user 204 for payment in connection with the order. When the user 204 finalizes payment for the order (step 416), the remote order management instruction set 136 may confirm payment details to ensure that the payment satisfies the order and the goods contained in the order based on current pricing of the goods and the amount of each good ordered by the user 204 (step 420). Thereafter, the remote order management instruction set 136 may determine a particular distribution location 112 at which the user 204 (or a representative thereof) will physically have the order fulfilled. In some embodiments, the user 204 may be allowed to select a particular distribution location 112 as the location at which the order will be fulfilled. Alternatively, or additionally, the remote order management instruction set 136 may automatically identify one or multiple distribution locations 112 which may be used to fulfill the order placed by the user 204. In some embodiments, the remote order management instruction set 136 may check with the distribution management instruction set 132 to determine whether the particular distribution location 112 has a sufficient amount of goods to fulfill the order. If not, then distribution management instruction set 132 may cause additional goods to be distributed to the particular distribution location 112 in advance of fulfillment or the remote order management instruction set 136 may select a different distribution location 112 to act as the fulfillment location if the different distribution location 112 has a sufficient number of goods to fulfill the order.

The information regarding the order details may then be transmitted to the selected distribution location(s) 112 and, in particular, to the dispensing controller 232 of a dispensing system 148 at each selected distribution location 112 (step 424). In this step, the remote order management instruction set 136 may communicate details regarding all bulk consumable goods in the order including, without limitation, type, amount, and purchase price for the bulk consumable good(s). The details of the order may then the added to the remote order queue 320 of each dispensing controller 232 that receives the information from the remote order management instruction set 136 (step 428). Adding the information to the remote order queue 320 will enable the dispensing system 148 to be prepared to distribute goods in accordance with the order when the user 204 or a designated representative thereof approaches the dispensing system 148 and confirms knowledge of the order for the goods (e.g., authenticates themselves to the dispensing system 148 and proves that they are either the user 204 or a designated representative of the user 204).

Figure 5:
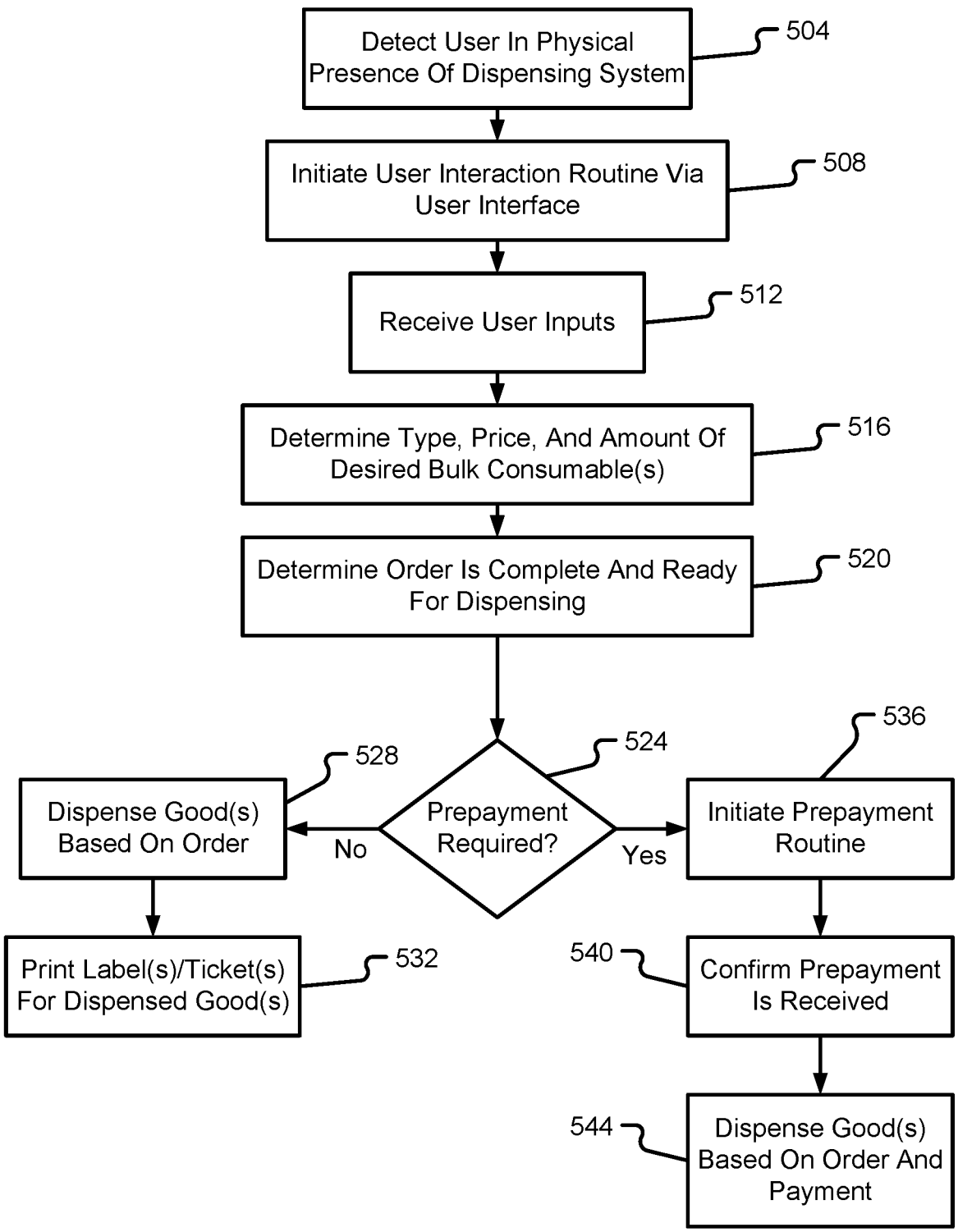
FIG. 5 is a flow diagram depicting an in-person ordering method in accordance with at least some embodiments of the present disclosure.

With reference now to FIG. 5, details of a method for dispensing bulk consumable goods (based either on a remote order or a locally-placed order) will be described in accordance with at least some embodiments of the present disclosure. The method begins when a dispensing system 148 detects a physical presence of a user 204 in front of the dispensing system 148 (step 504). The presence may be detected using a proximity sensor, a motion sensor, or the like. Alternatively or additionally, the dispensing system 148 may detect the user 204 with its biometric recognition system 256 and/or a mobile device interface 236 that detects a mobile device being carried by the user 204 and being used to communicate with the dispensing system 148 (e.g., via Bluetooth® pairing, NFC pairing, optical recognition of a displayed barcode or QR code, etc.).

Upon detecting the user 204, the dispensing system 148 continues by initiating a user interaction routine via the user interface 240 (step 508). The user interaction routine may include a series of prompts issued via the user interface 240 and may also include receiving user 204 responses to those prompts (e.g., via the user interface 240 or via the mobile device interface 236) (step 512). As user inputs are received, the dispensing system 148 may invoke the dispensing controller 232 to determine a type, price, and amount of bulk consumable goods desired by the user 204 (step 516). This may be determined based on a series of inputs received via the user interface 240 and/or based on a series of inputs received via the mobile device interface 236 (e.g., if the user 204 is inputting order details at their mobile device and those order details are then communicated to the dispensing controller 232 by way of the mobile device interface 236).

The user 204 may be allowed to continue providing order details and requesting more bulk consumable goods as part of the order. Eventually, the user 204 may indicate that the order is complete and ready for dispensing by the dispensing system 148 (step 520). At this point, the dispensing controller 232 may determine whether the order requires prepayment before dispensing is allowed (step 524). If this query is answered negatively, then the dispensing controller 232 may automatically initiate fulfillment of the order and begin dispensing goods based on the types and quantities identified in the order (step 528). As each good is dispensed, the dispensing controller 232 may cause the printer 244 to print a label or ticket for each dispensed good (step 532). The label or ticket for each dispensed good may then be carried by the user 204 to a POS terminal to finalize payment for the dispensed goods with the POS system 248.

Referring back to step 524, if the query is answered affirmatively, then the method continues with the dispensing controller initiating a prepayment routine (step 536). In some embodiments, the dispensing logic 312 may invoke the POS system 248 to begin the prepayment routine by issuing a payment instruction to the POS system 248 through the payment/POS API 340. The payment instruction may include an identification of the type, amount, and price of each good to be dispensed by the dispensing system 148. Once the user 204 finalizes payment with the POS system 248 and the dispensing logic 312 determines that the prepayment has been received at the POS system 248 (step 540), the dispensing logic 312 may begin the process or dispensing the appropriate amount of identified goods via actuation of the various dispensers 212, 220, 228 (step 544).

Figure 6:
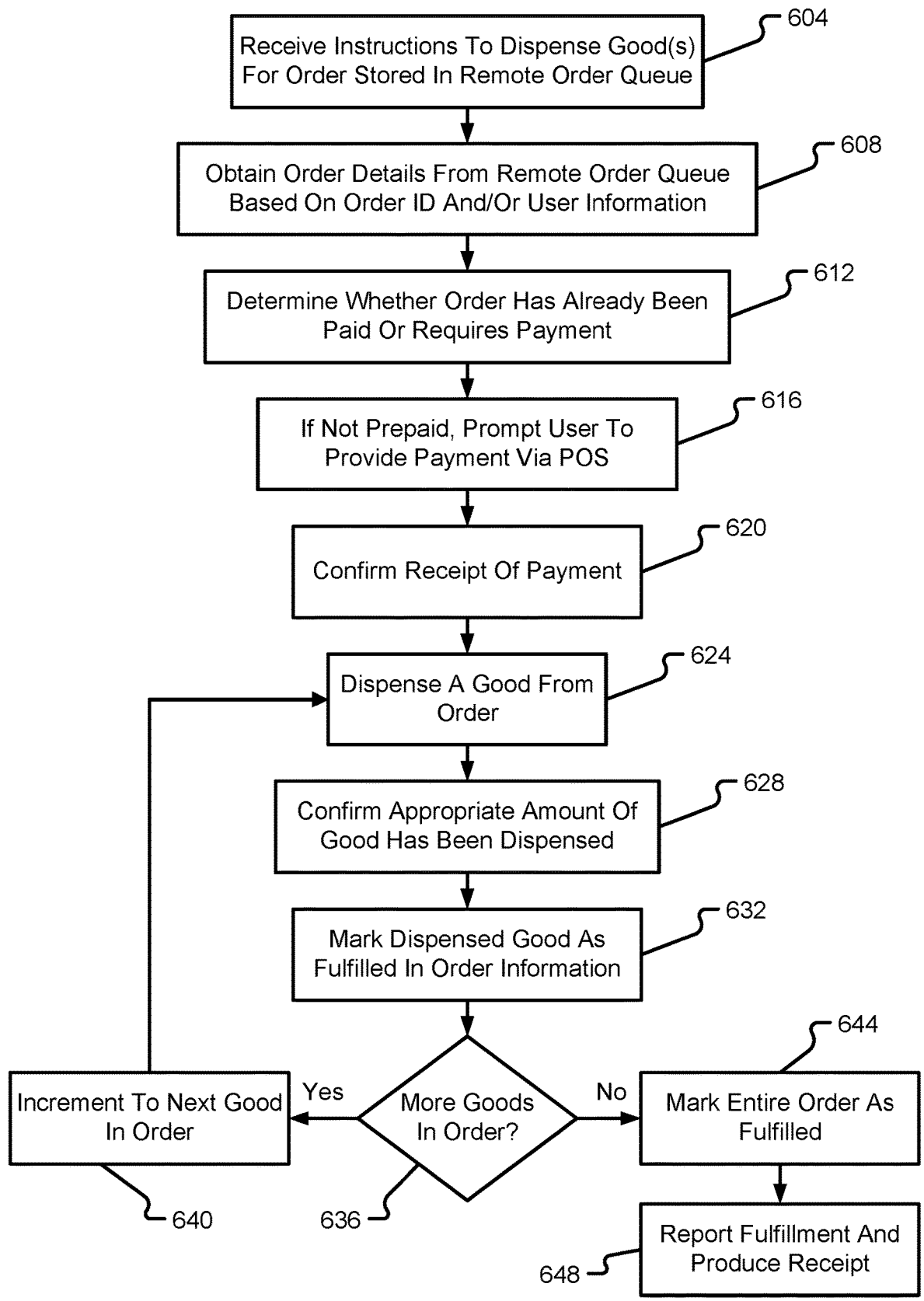
FIG. 6 is a flow diagram depicting a dispensing method in accordance with at least some embodiments of the present disclosure.

With reference now to FIG. 6, additional details of a dispensing method will be described in accordance with at least some embodiments of the present disclosure. The method begins with the dispensing controller 232 receiving an instruction from a user 204 to dispense goods from an order stored in the remote order queue 320 (step 604). The instructions may include receiving an input from the user 204 via the user interface 204 and/or receiving an input from a user's 204 mobile device via the mobile device interface 236. The input may include an identifier associated with the remote order (e.g., an order number, a customer number, a unique number encoded in a QR or barcode, etc.). Alternatively or additionally, the user 204 or a representative thereof may authenticate themselves with the dispensing system 148 (e.g., by providing biometric information, user contact information in the form of an email address, username information, etc.) and the authentication may result in the dispensing controller 232 identifying that an order is stored in the remote order queue 320 with corresponding user information.

Upon receiving the appropriate input and identifying the remote order (and optionally authenticating the user 204 or representative thereof), the dispensing controller 232 may continue by obtaining order details from the remote order queue 320 (step 608). The dispensing controller 232 may further determine whether the order has already been paid for or whether payment is still required (step 612). If the order is not prepaid, then the dispensing controller 232 may initiate the payment process via the POS system 248 (step 616).

When the dispensing controller 232 confirms receipt of the payment (or confirms that prepayment was already provided), the dispensing controller 232 may initiate the dispensing process for the order. In particular, the dispensing controller 232 may start by identifying a first good in the order and actuating the appropriate dispenser 212, 220, 228 to dispense the appropriate amount of the first good from the order (step 624). When the dispensing controller 232 confirms that the appropriate amount of the first good has been dispensed (e.g., based on inputs received from the measurement systems 332) (step 628), the dispensing controller 232 may mark that particular good as dispensed within the data structure of the order being fulfilled (step 632).

Thereafter, the dispensing controller 232 may determine whether there are more goods to fulfill for the order (step 636). If this query is answered affirmatively, then the dispensing controller 232 may increment to the next good in the order (step 640) and repeat the process of dispensing, confirming, and marking the good as dispensed from the order. After the dispensing controller 232 determines that the order has been completely fulfilled (e.g., there are no remaining goods in the order), then the method continues with the dispensing controller 232 marking the entire order as fulfilled (step 644). The method may also include reporting fulfillment of the order within the remote order queue 320 and producing a receipt for the fulfilled order by causing the printer 244 to print an appropriate receipt (step 648). In some embodiments, the reporting of fulfillment may include the dispensing controller 232 reporting that the order was fulfilled with a fulfillment message being transmitted back to the remote order management instruction set 136. The fulfillment message may also be provided to the distribution management instruction set 132 to enable knowledge of the fulfillment to be known to the entity that is coordinating the distribution of further goods among the distribution locations 112. For instance, the fulfillment of the order at one distribution location 112 may need to be reported to other distribution locations 112 to remove the details of that order from other local remote order queues 320 at other distribution locations 112. The coordination of this reporting may be facilitated by the remote order management instruction set 136. Furthermore, the distribution management instruction set 132 is made aware of the fulfillment and may use that information to cause additional goods to be distributed to the distribution location 112 that just fulfilled the order.

Figure 7:
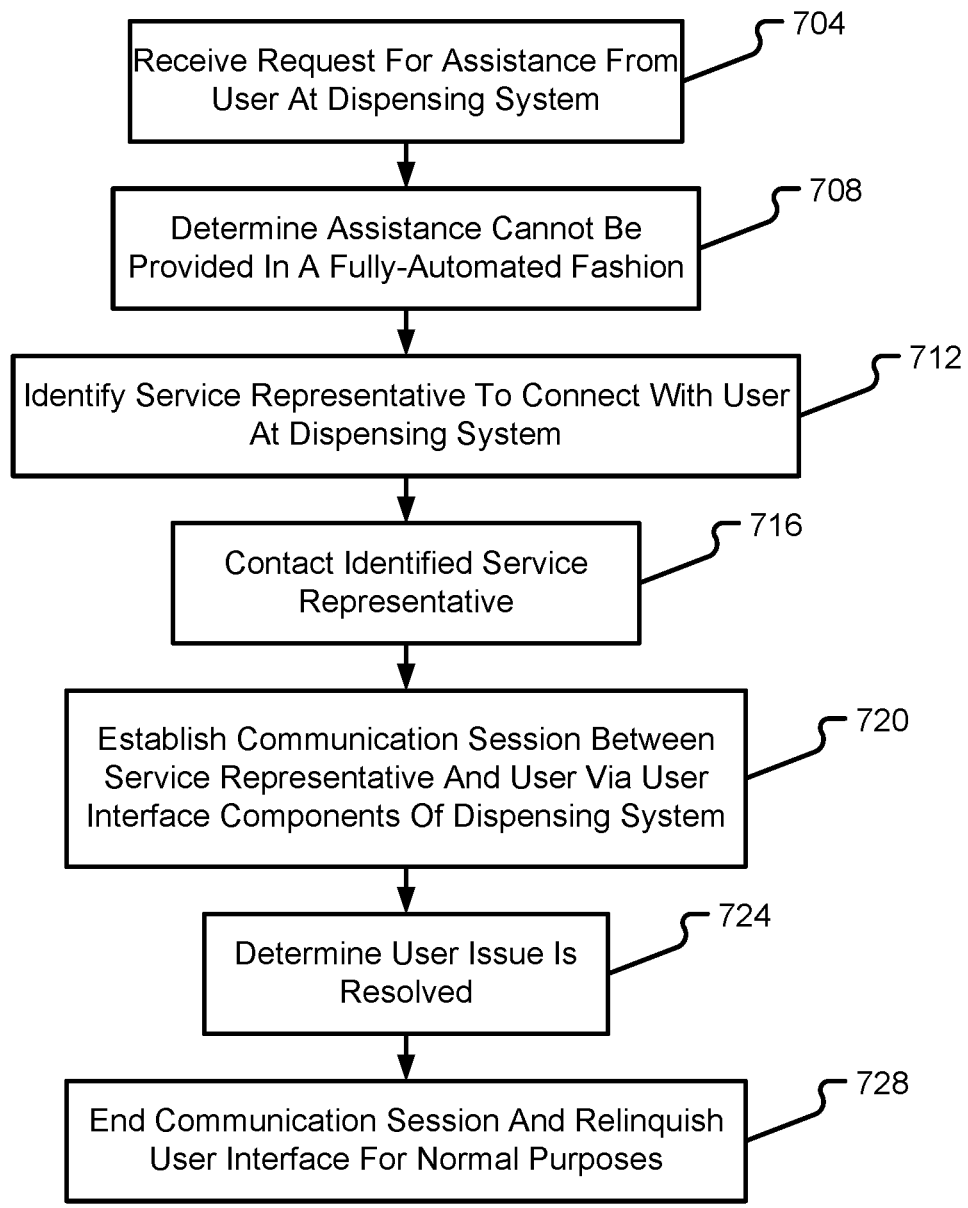
FIG. 7 is a flow diagram depicting a customer service method in accordance with at least some embodiments of the present disclosure.

With reference now to FIG. 7, additional details of a user 204 assistance method will be described in accordance with at least some embodiments of the present disclosure. The method begins when a user 204 provides a request for assistance to the dispensing system 148 (step 704). The request for assistance may be registered when the user 204 presses a "help" button or the like on the user interface 240 of the dispensing system 148.

The method may then continue with the dispensing system 148 or some logic contained in the dispensing controller 232 determining that the user assistance cannot be provided in a fully-automated fashion (step 708). In other words, the method may continue with the dispensing system 148 determining that the user 204 should be connected with a human customer service representative.

In response to determining that fully-automated assistance is insufficient for the user 204, the method continues by identifying a customer service representative that is available and equipped to connect with the user 204 at the dispensing system 148 (step 712). In some embodiments, the customer service representative may be identified based on a skill of the customer service representative, an availability of the customer service representative on their communication device, and/or a physical location of the customer service representative. The identifying customer service representative is then contacted with one or more messages or alerts at their communication device (step 716).

When the customer service representative responds to the contact or alert, the method may continue by establishing a communication session between the communication device of the customer service representative and the dispensing system 148 (step 720). In particular, the user 204 may be allowed to communicate with the customer service representative through a real-time communication session (e.g., voice, video, chat, combinations thereof, etc.) that involves the dispensing system 148 and the communication device of the customer service representative. The communication session may include enabling the user 204 and the customer service representative to share audio, video, and/or text communications with one another where the user 204 may be allowed to engage in the communication session using the user interface 240 of the dispensing system 148. The communication session may be maintained until it is determined that the user's 204 issue is sufficiently resolved (step 724). This may be determined with the user 204 pressing an "end call" button or the like on the user interface 240. After determining that the user's 204 issue is sufficiently resolved, the method ends by terminating the communication session and relinquishing the user interface 240 for normal purposes (e.g., to facilitate placement of orders for bulk consumable goods and to facilitate payment for the same) (step 728).

Figure 8:
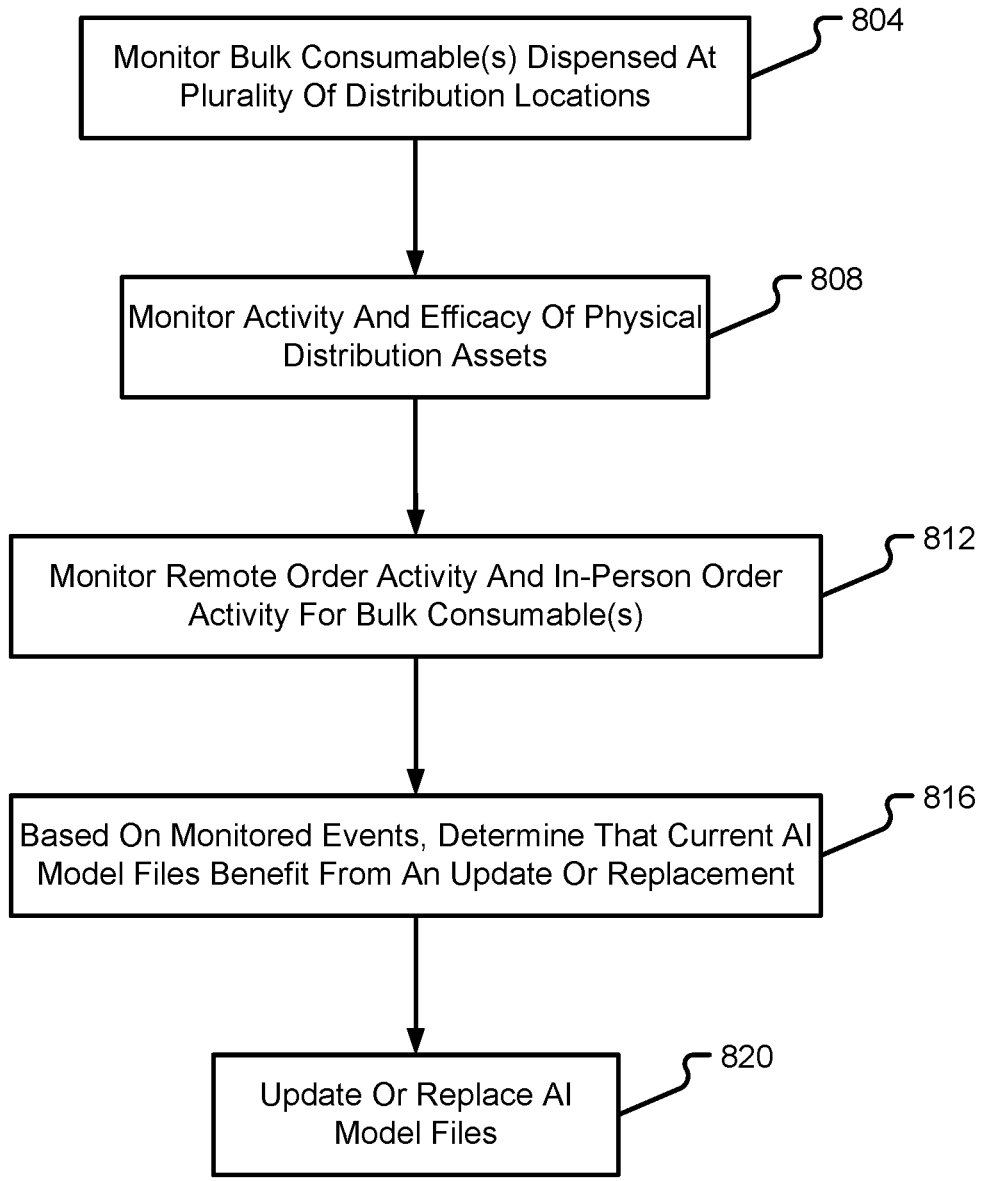
FIG. 8 is a flow diagram depicting a machine learning method as used in connection with bulk consumable good distribution and dispensing in accordance with at least some embodiments of the present disclosure.

With reference now to FIG. 8, a method of operating an AI system in a system 100 used to dispense bulk consumable goods will now be described in accordance with at least some embodiments of the present disclosure. The method begins with the AI models 140 monitoring bulk consumable(s)) dispensed at a plurality of different distribution locations 112 (step 804). In this step, any transaction information related to the distribution of a bulk consumable good may be reported to the distribution database 144 from the dispensing controller 232 used to locally facilitate the dispense a good from a dispensing system 148. The AI models 140 may monitor changes to the distribution database 144 in real-time, continuously, or on a periodic basis.

The method may also include the AI models 140 monitoring activity and efficacy of physical distribution assets 116 operating in the system 100 (step 808). In particular, the AI models 140 may monitor paths travelled by the physical distribution assets 116, types of goods and quantities of goods carried by physical distribution assets 116, and determine whether or not other distribution plans would enable those goods to be distributed in a manner that is better optimized for a particular purpose (e.g., to decrease time between order placement and fulfillment, to decrease costs, to minimize travel time, to minimize physical distribution assets 116, etc.).

The AI models 140 may also monitor orders received at the remote order management instruction set 136 and specifically identify any remote orders that include bulk consumable goods (step 812). In this step, the AI models 140 may also determine which distribution locations 112 were identified to be a fulfillment location for the order and then determine which distribution location 112 was actually used for fulfillment of the order (e.g., if multiple distribution locations 112 were initially identified as eligible for fulfillment).

Based on the different data monitored and tracked by the AI models 140, the method may continue by comparing the performance of the AI models and decisions made thereby (e.g., decisions to proactively allocate physical distribution assets 116 or to proactively order more of a particular type of consumable good) with other possible decisions that could have been made (but were not made) had a different AI model been used (step 816). In particular, multiple parallel decisions may be made on the same input data by multiple different AI models and/or by the same AI model with different neural network configurations or coefficient values between nodes. In some embodiments, this step may also include updating training data sets with newly validated data in the distribution database 144 and determining whether the new training data sets should change any aspect of the AI models 140 currently being used to make decisions at the distribution control server 108.

Based on the performance of the various alternative AI models and/or neural networks, the method may then result in a decision to update or replace one or more AI model files that were previously being used by the distribution control server 108 (step 820). It should be appreciated that this particular method may be performed continuously or periodically depending upon the frequency with which data in the distribution database changes. It should also be appreciated that as different optimization goals are defined within the dispensing system 148, then different AI models may be used to satisfy those different optimization goals.

Figure 9:
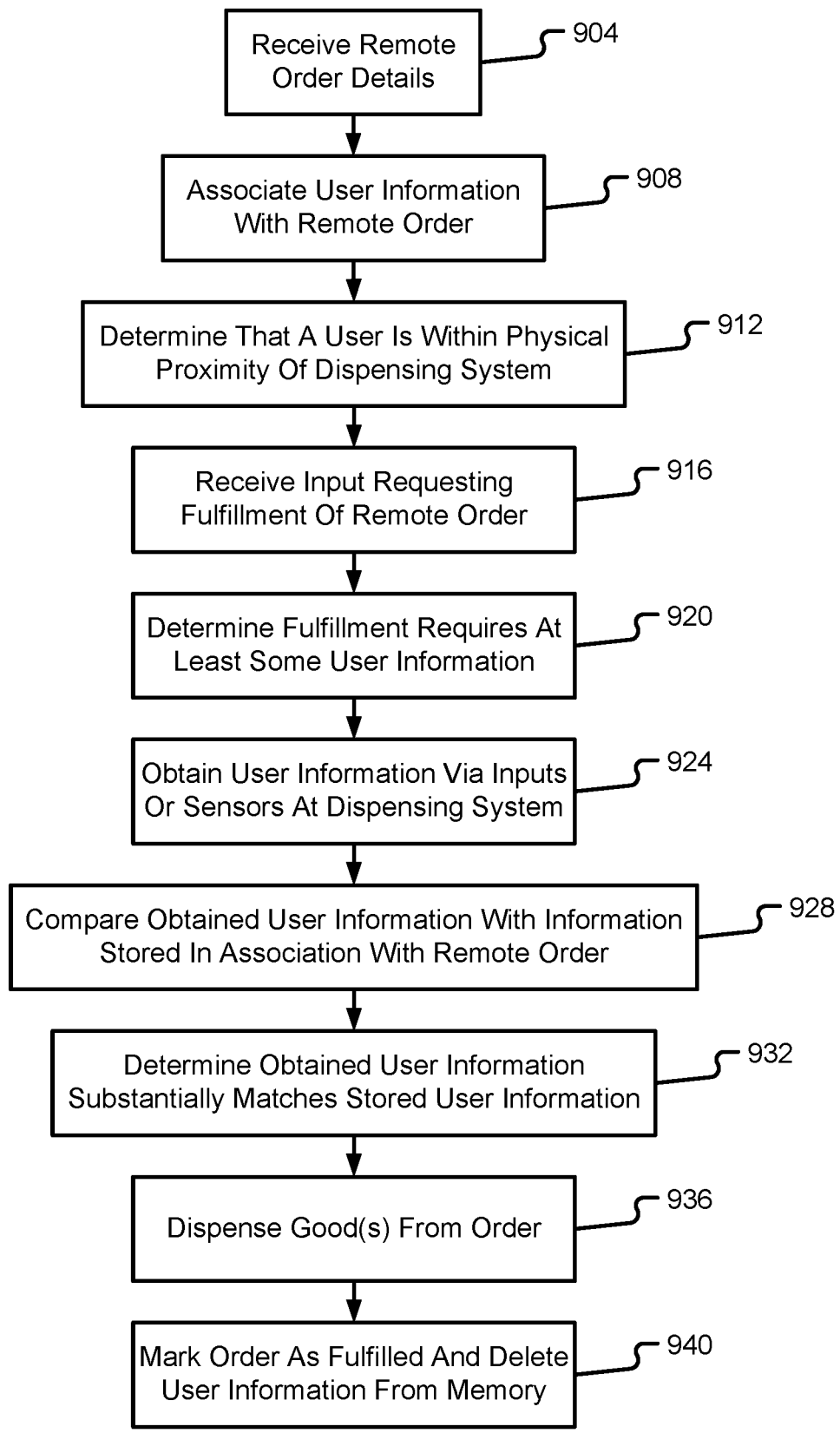
FIG. 9 is a flow diagram depicting a fulfillment method in accordance with at least some embodiments of the present disclosure.

With reference now to FIG. 9, a method of enabling order fulfillment based on receiving user information will be described in accordance with at least some embodiments of the present disclosure. The method begins by receiving remote order details at a dispensing controller 232 of a particular dispensing system 148 (step 904). The order may include some type of user information associated therewith (step 908). The order and the associated user information may be stored in the remote order queue 320 until the order is fulfilled.

The method continues when the dispensing system 148 determines that a user 204 is within a predetermined physical proximity (step 912). In some embodiments, a physical proximity can be detected using one or more image capture devices, based on the user's 204 mobile device pairing with the mobile device interface 236, and/or based on the user 204 pressing one or more inputs at the user interface 240.

The method may continue with the user 204 providing one or more inputs requesting fulfillment of a remote order (step 916). In response to receiving such an input, the dispensing logic 312 may determine that order fulfillment requires at least some user information (e.g., authentication of the user 204 or an authorized representative thereof) (step 920). In response to such a determination, the dispensing logic 312 may cause the dispensing system 148 to request or obtain at least some user information via various inputs of the dispensing system 148 (step 924). For instance, the user 204 (or representative thereof) may be required to input username and password information, identify correspondence information, type in an order number, and/or provide biometric information to the biometric recognition system 256.

If the required user information includes some amount of biometric information, then the method may continue with the biometric recognition system 256 obtaining one or more biometric features of the person within physical proximity of the dispensing system 148 (step 924). The obtained features may be compared with user information stored in association with one or all of the remote orders stored in the remote order queue 320 (step 928). For instance, the biometric features (e.g., facial features, fingerprint features, iris features, voice features, etc.) captured by the biometric recognition system 256 may be compared to biometric templates stored in the remote order queue 320 in association with remote orders that have already been placed.

Based on the comparison, the biometric recognition system 256 may determine whether or not the obtained user information matches (e.g., within a predetermined match threshold) any of the user information stored in association with an order (step 932). If this query is not answered positively, then the method may not continue. However, if there is a substantial match between the obtained biometric information and the user information stored in association with an order, then the method may continue with the dispensing logic 312 causing the various dispensers 212, 220, 228 to dispense the appropriate goods from the order (step 936). Thereafter, the method may continue with the dispensing controller 232 marking the order as fulfilled and then deleting the user information from memory 308 (step 940). Moreover, as part of reporting fulfillment, any other memory device at any other distribution location 112 that was used to store the user's 204 biometric information may be instructed to delete the biometric information. The distribution controller 108 may be responsible for maintaining the only copy of the user's 204 biometric information in an encrypted format (e.g., within the distribution database 144 or some other secure data storage facility).

In some embodiments, the biometric recognition system 256, as described previously, may provide one or more user interfaces 240 to expedite payment or other transactions and/or communications. Example user interfaces 240 include speech recognition, handwriting recognition, hand gesture recognition, brain wave recognition, and/or other methods to provide user input of the person 204 within physical proximity of the dispensing system 148. AI models 140 may be used to process the data captured in one or more of these user interfaces and/or a software application may be used. Training of the AI models 140 may be required for these user interfaces 240 to operate with sufficient accuracy. Training may include specific customer's 204 and/or groups of customer's 204 to provide one or more machine-learning training data sets.

To implement speech recognition to allow customer 204 to enter user input, the biometric recognition system 256 and/or the user interface 240 may include a microphone to record sound and one or more technologies to process the sound, including frequency estimation, hidden Markov models, Gaussian mixture models, pattern matching algorithms, neural networks, matrix representation, vector quantization and decision trees. A software application or AI models 140 may be used to translate the processed voice into digital text and/or interface interactions (e.g., moving a computer mouse, pressing a button, selecting a bulk consumable good, moving a scrollbar and/or other interface interactions).

To implement handwriting recognition to allow customer 204 to enter user input, the biometric recognition system 256 and/or the user interface 240 may include a pen or stylus for the user 204 to write with, a touch sensitive surface, and a software application or AI models 140 that interprets the movements of the stylus across the writing surface, translating the resulting strokes into digital text. To implement hand gesture recognition to allow customer 204 to enter user input, the biometric recognition system 256 and/or the user interface 240 may include electromyographic signals from one or more wearable devices, Time-of-Flight (ToF) sensors, and/or cameras; and a software application or AI models 140 that translates the hand gestures into digital text and/or interface interactions.

To implement brain wave recognition to allow customer 204 to enter user input, the biometric recognition system 256 and/or the user interface 240 may include electroencephalogram (EEG) equipment to track and record brain wave patterns of customer 204 that is used by a software application or AI models 140 to convert the brain wave patterns into shapes and images, and associate these shapes and images with potential or recommended bulk consumable goods. Alternatively, or additionally, cameras and/or sensors may be used to track the customer's 204 behavior (e.g., where the eyes are focused, facial expression, heartrate, or other behaviors), and a software application or AI models 140 may be used to associate these behaviors with potential or recommended bulk consumable goods.

Figure 10:
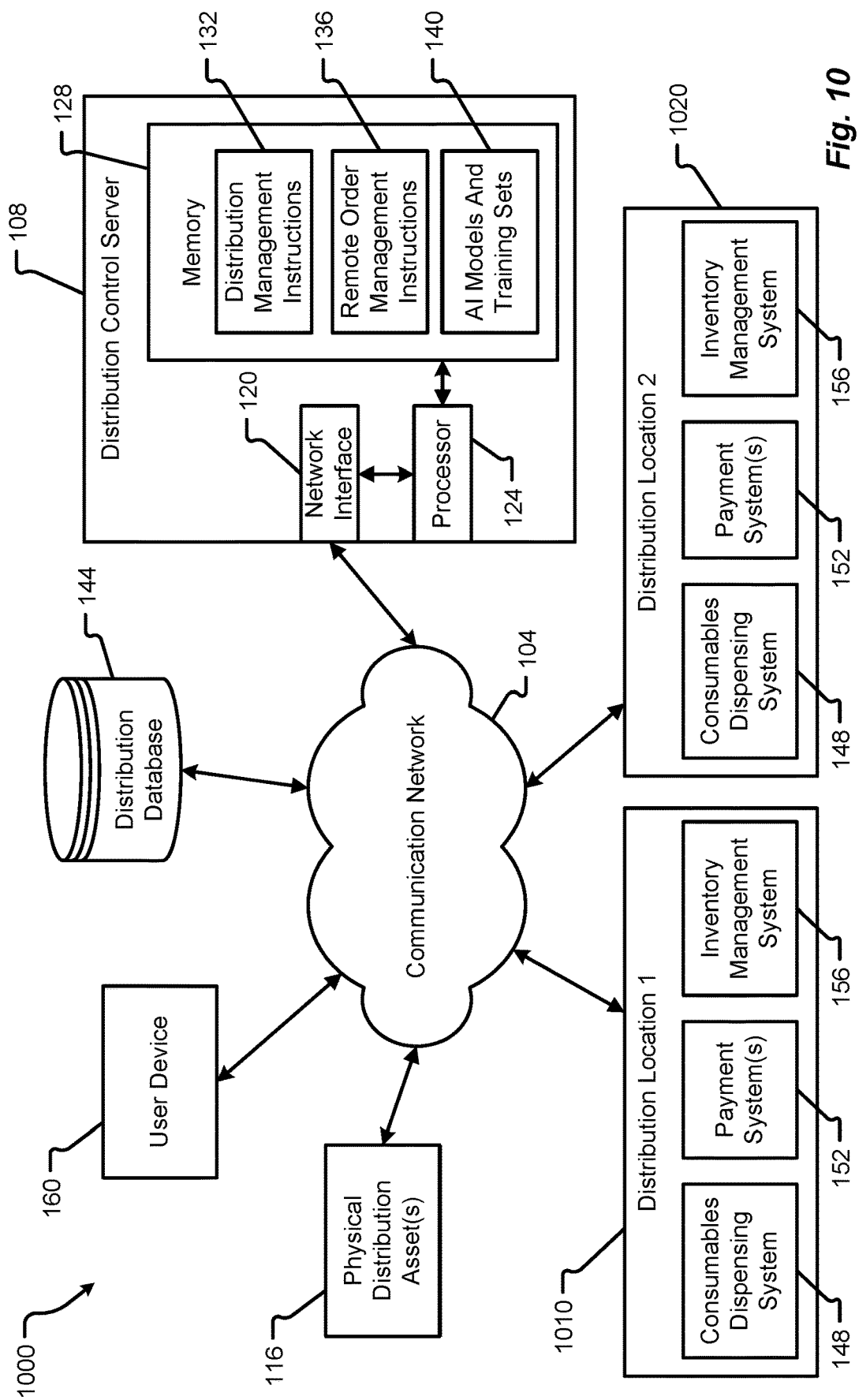
FIG. 10 is a block diagram depicting a system in accordance with at least some embodiments of the present disclosure.
Figure 13:
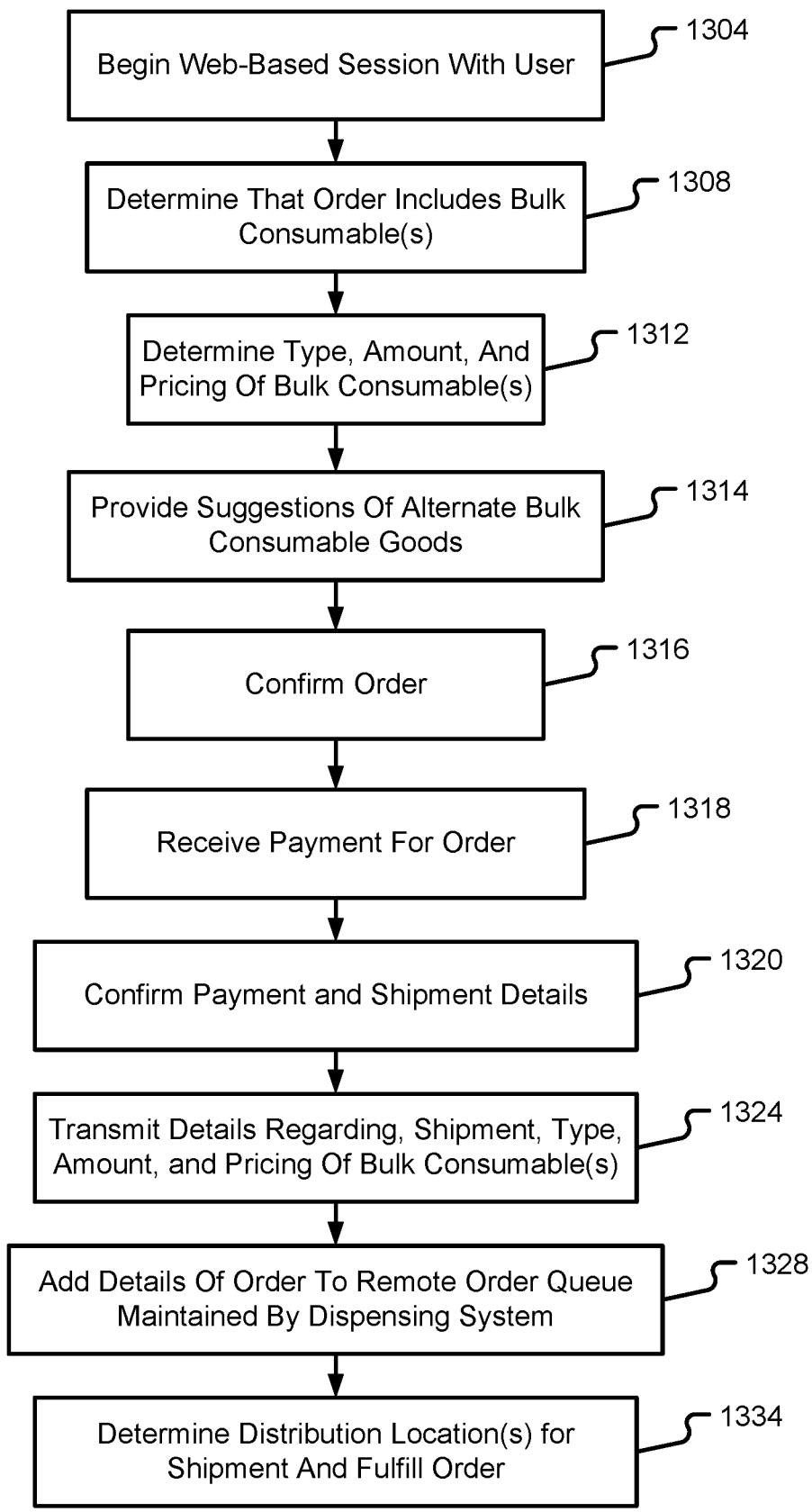
FIG. 13 is a flow diagram depicting a remote ordering and shipping location in accordance with at least some embodiments of the present disclosure.

With reference now to FIG. 10, a system 1000 used for the distribution and management of multiple dispensing systems will be described in accordance with at least some embodiments of the present disclosure. The system 1000 is similar to or the same as system 100. The system 1000 is shown to include a communication network 104 that enables electronic communications between a distribution control server 108 and a number of other communication nodes in the system 1000. The other nodes that may be monitored and controlled by the distribution control server 108 include, without limitation, distribution locations 1010 and 1020 and assets as distribution locations 1010 and 1020, physical distribution assets 116, user devices 160, and a distribution database 144. In some embodiments, the distribution control server 108 may be configured to monitor a level of inventory for various consumable goods available for purchase and/or distribution at the various distribution locations 1010 and 1020. As inventory levels for particular goods at distribution locations 1010 and 1020 fall below a predetermined (or programmable) threshold the distribution control server 108 may alert and dispatch certain physical distribution assets 116 to deliver more goods to the affected distribution locations 1010 and 1020. In some embodiments, a physical distribution asset 116 may correspond to a delivery truck, a communication device carried by a driver of a delivery truck, or a distribution facility in a predetermined location that has multiple delivery trucks and/or drivers. The physical distribution asset 116 may be responsible for physically delivering consumable goods to distribution locations 1010 and 1020, which may correspond to a retail store or other physical location where a customer is able to purchase and/or pick up bulk consumable goods, perhaps among other goods. Alternatively, or additionally, the physical distribution asset 116, or one or more of the distribution locations may be responsible for physically delivering consumable goods to a user 204, as shown in FIG. 13. In system 1000, two distribution locations 1010 and 1020 are depicted, but system 1000 may comprise two or more distribution locations.

Similar to distribution location 112, each distribution location 1010 and 1020 may include, one, two, or many dispensing systems 148 that physically store and distribute consumable goods to a customer. In some embodiments, distribution locations 1010 and 1020 may also include one or more payment systems 152 and an inventory management system 156. The payment systems 152 may include one or more POS terminals, one or more hand-held terminals, or the like that are connected to a payment management server, which may be provided at the distribution location or at a centralized location, such as the location also housing the distribution control server 108. The inventory management system 156 may be configured to manage the inventory of goods at the particular distribution location. The inventory management system 156 may be in communication with the dispensing system 148 to determine an amount of inventory for each of the goods being distributed by the dispensing system 148, when additional goods are dispensed by the dispensing system 148, and/or when a particular amount of a good is below a particular threshold. The inventory management system 156 may also be configured to communicate with the distribution control server 108 to report various states of the goods at the distribution locations 1010 and 1020, thereby enabling the distribution control server 108 to know when additional good(s) of a particular type need to be distributed to the distribution locations 1010 and 1020 via the physical distribution assets 116. Alternatively, or additionally, inventory information from the inventory management system 156 may be reported or uploaded to a distribution database 144 and then the distribution control server 108 may run regular or periodic queries against the distribution database 144 to determine whether and when additional goods should be distributed to distribution locations 1010 and 1020. The distribution database 144 may be provided in any type of known or yet-to-be-developed database format. For instance, the distribution database 144 may include a SQL database, a noSQL database, a relational database, a graph database, a distributed ledger, a real-time database, or a combination thereof.

In some embodiments, the user device 160 may be used to place remote orders for goods that can be processed by the distribution control server 108 and then fulfilled, either by the customer or a representative thereof, at the distribution locations 1010 and 1020. Alternatively, or additionally, the user device 160 may be used to place remote orders for goods that can be processed by the distribution control server 108 and then fulfilled by shipping the goods from the physical distribution asset 116, or one or more of the distribution locations 1010 and 1020 for physically delivering consumable goods to a user 204, as shown in FIG. 13.

The remote order management instruction set 136, when executed by the processor 124, may enable the distribution control server 108 to offer and respond to remote orders placed by a customer at a user device 160. In some embodiments, the remote order management instruction set 136 may present a web-based interface (e.g., a website or ordering portal) to the user device 160 and enable the customer to place an order for goods via the web-based interface. The orders received at the remote order management instruction set 136 may be communicated to appropriate distribution locations 1010 and 1020 to enable those locations to either fulfill the order on behalf of the customer or enable the distribution locations 1010 and 1020 to be prepared for the customer (or a representative thereof) to visit the dispensing system 148 at that particular distribution location 1010 and/or 1020 and receive the ordered goods.

The AI models 140 may enable the distribution control server 108 to monitor customer behaviors relative to various distribution locations, check inventory levels, and determine whether and when distribution instructions should be sent (e.g., to the physical distribution assets). The AI models 140 may also be configured with intelligence to predict when an order or multiple orders are likely to be placed (e.g., based on seasonal trends, historical trends, price fluctuations, predicted customer behavior, etc.) and then proactively distribute goods to particular distribution locations 1010 and/or 1020 in response to such predictions. The AI models 140 may also be configured to assist the dispensing systems 148 to intelligently respond to customer requests and facilitate automated customer service interactions at the dispensing systems 148. Additionally, the AI models 140 may provide suggestions of alternate goods to a user 204 based on prior transactions, similar goods, and/or transactions of other users 204, as shown in FIGS. 11, 12, and 13.

Figure 11:
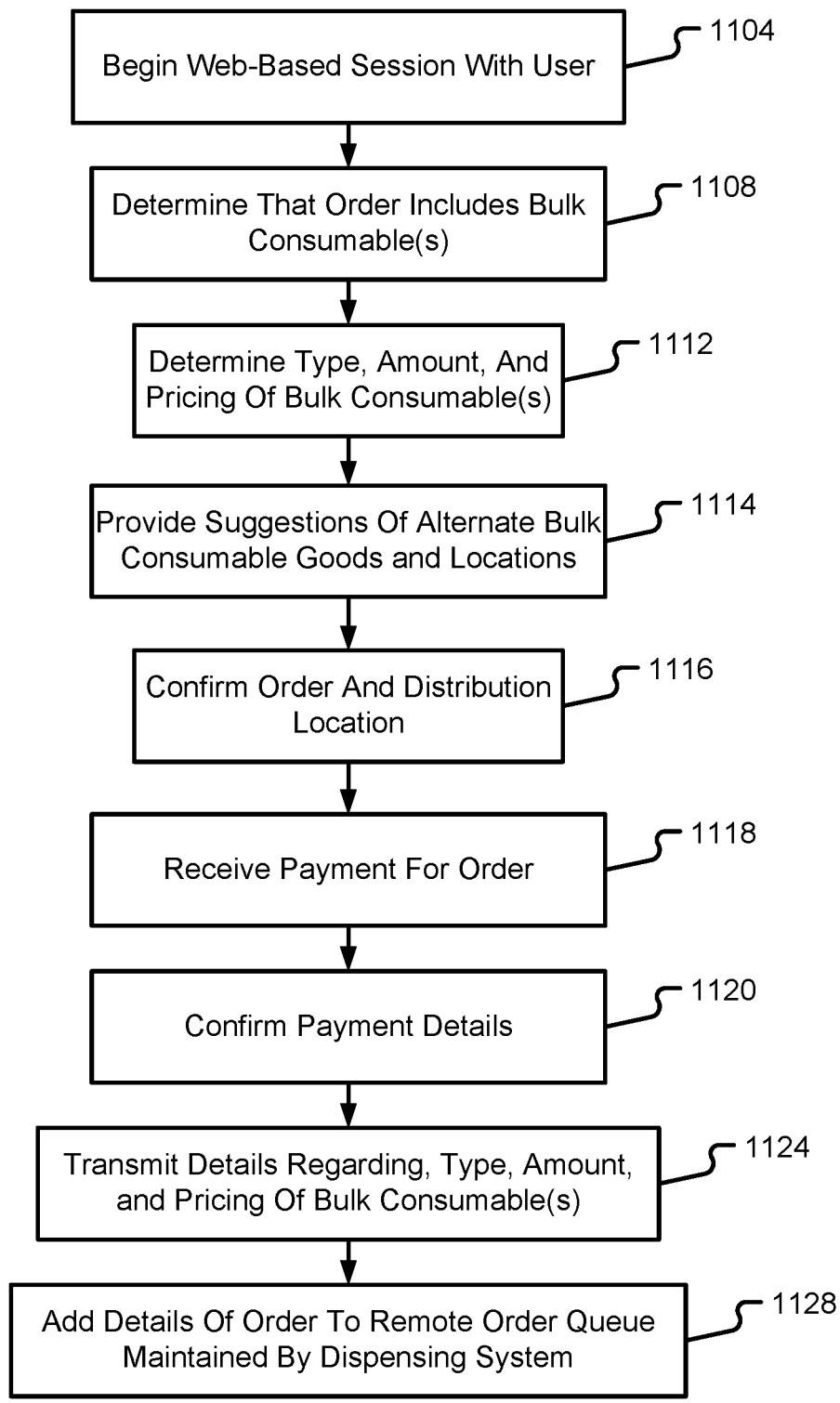
FIG. 11 is a flow diagram depicting a remote ordering method in accordance with at least some embodiments of the present disclosure.
Figure 12:
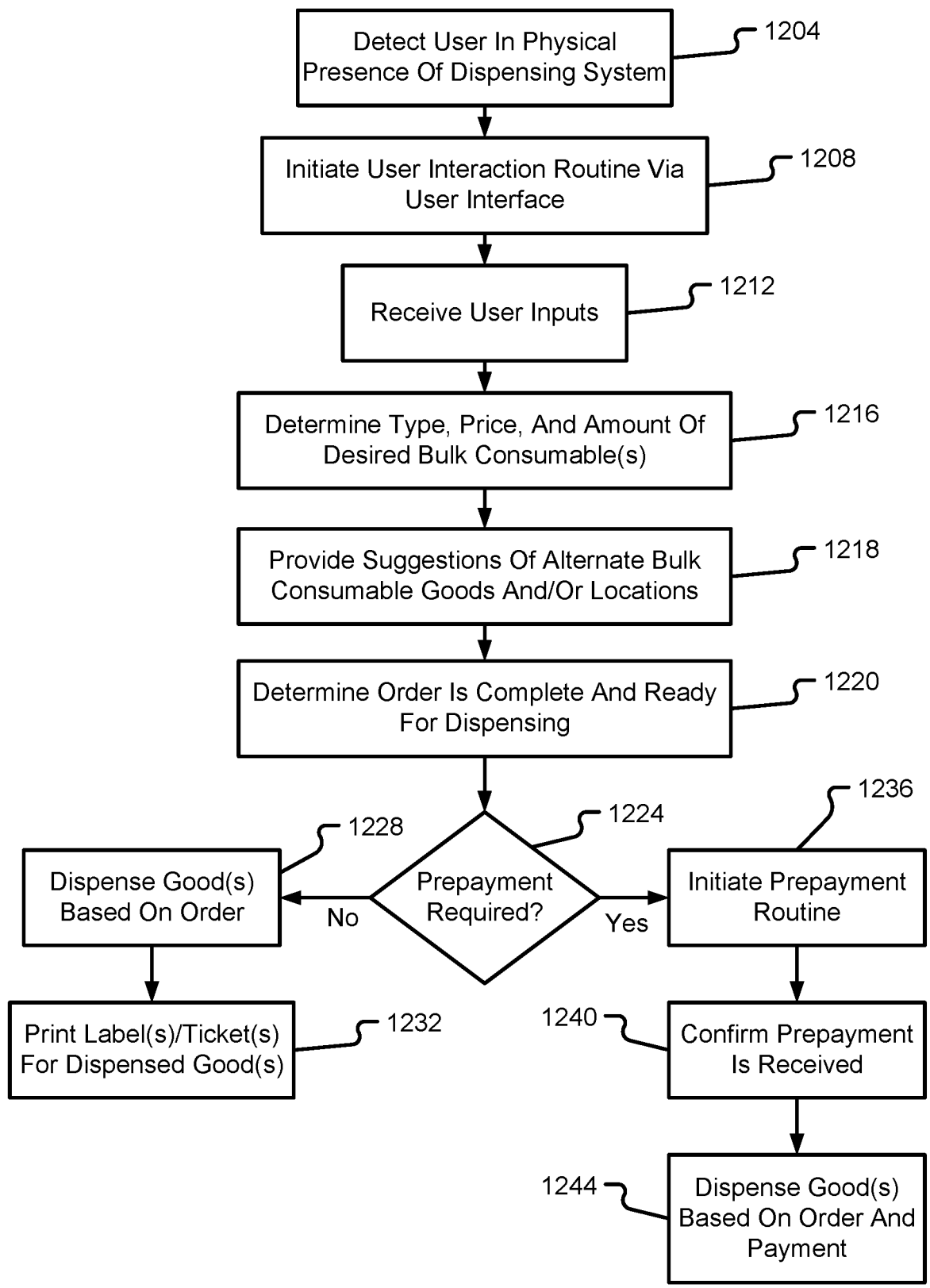
FIG. 12 is a flow diagram depicting an in-person ordering method in accordance with at least some embodiments of the present disclosure.

With reference now to FIG. 11, a method of enabling a user 204 to place a remote order with a user device 160 for bulk consumable goods will be described in accordance with at least some embodiments of the present disclosure. The method begins by enabling the user 204 to engage in a web-based session with the distribution control server 108 (step 1104). In some embodiments, the user device 160 is presented with one or more pages (e.g., html pages, mobile web pages, etc.) that enable the user 204 to place an order for one or more goods with the remote order management instruction set 136.

The method continues by determining that the user's 204 order includes one or more bulk consumable goods (step 1108). The type, amount, and pricing associated with each bulk consumable good is determined (step 1112) by the remote order management instruction set 136 and added to a shopping cart or the like for the user's 204 order.

The method then continues by providing suggestions for alternate bulk consumable goods and/or distribution locations (step 1114) based on prior transactions, similar goods, and/or transactions of other users 204. The user 204 may select the distribution location 1010 or 1020 that will dispense the consumable goods. When user 204 selects a distribution location 1010 and/or 1020 that does not currently have the selected consumable goods, the remote order management instruction set 136 may suggest alternate goods. Alternately, the physical distribution asset 116 may have the selected consumable goods delivered to the selected distribution location 1010 and/or 1020.

In some embodiments, the remote order management instruction set 136 also provides suggestions of alternate bulk consumable goods as the customer 204 enters a remote order. The selection of alternate bulk consumable goods may be based on past transaction history and distribution locations 1010 and/or 1020 used by the customer 204 and stored in the distribution database 144. The remote order management instruction set 136 may also recommend bulk consumable goods that were ordered in prior transactions that were ordered concurrently with one or more of the bulk consumable goods in the current remote order.

The method then continues by prompting the user 204 for payment in connection with the order (step 1116). When the user 204 finalizes payment for the order (step 1118), the remote order management instruction set 136 may confirm payment details to ensure that the payment satisfies the order and the goods contained in the order based on current pricing of the goods and the amount of each good ordered by the user 204 (step 1120). Thereafter, the remote order management instruction set 136 may determine a particular distribution location 1010 or 1020 at which the user 204 (or a representative thereof) will physically have the order fulfilled. In some embodiments, the user 204 may be allowed to select a particular distribution location 1010 or 1020 as the location at which the order will be fulfilled. Alternatively, or additionally, the remote order management instruction set 136 may automatically identify one or multiple distribution locations 1010 and 1020 which may be used to fulfill the order placed by the user 204. In some embodiments, the remote order management instruction set 136 may check with the distribution management instruction set 132 to determine whether the particular distribution location 1010 or 1020 has a sufficient amount of goods to fulfill the order. If not, then distribution management instruction set 132 may cause additional goods to be distributed to the particular distribution location 1010 or 1020 in advance of fulfillment or the remote order management instruction set 136 may select a different distribution location 1010 or 1020 to act as the fulfillment location if the different distribution location 1010 or 1020 has a sufficient number of goods to fulfill the order.

The information regarding the order details may then be transmitted to the selected distribution location(s) 1010 or 1020 and, in particular, to the dispensing controller 232 of a dispensing system 148 at each selected distribution location 1010 or 1020 (step 1124). In this step, the remote order management instruction set 136 may communicate details regarding all bulk consumable goods in the order including, without limitation, type, amount, and purchase price for the bulk consumable good(s). The details of the order may then the added to the remote order queue 320 of each dispensing controller 232 that receives the information from the remote order management instruction set 136 (step 1128). Adding the information to the remote order queue 320 will enable the dispensing system 148 to be prepared to distribute goods in accordance with the order when the user 204 or a designated representative thereof approaches the dispensing system 148 and confirms knowledge of the order for the goods (e.g., authenticates themselves to the dispensing system 148 and proves that they are either the user 204 or a designated representative of the user 204).

With reference now to FIG. 12, details of a method for dispensing bulk consumable goods (based either on a remote order or a locally-placed order) will be described in accordance with at least some embodiments of the present disclosure. The method begins when a dispensing system 148 detects a physical presence of a user 204 in front of the dispensing system 148 (step 1204). The presence may be detected using a proximity sensor, a motion sensor, or the like. Alternatively or additionally, the dispensing system 148 may detect the user 204 with its biometric recognition system 256 and/or a mobile device interface 236 that detects a mobile device being carried by the user 204 and being used to communicate with the dispensing system 148 (e.g., via Bluetooth® pairing, NFC pairing, optical recognition of a displayed barcode or QR code, etc.).

Upon detecting the user 204, the dispensing system 148 continues by initiating a user interaction routine via the user interface 240 (step 1208). The user interaction routine may include a series of prompts issued via the user interface 240 and may also include receiving user 204 responses to those prompts (e.g., via the user interface 240 or via the mobile device interface 236) (step 1212). As user inputs are received, the dispensing system 148 may invoke the dispensing controller 232 to determine a type, price, and amount of bulk consumable goods desired by the user 204 (step 1216). This may be determined based on a series of inputs received via the user interface 240 and/or based on a series of inputs received via the mobile device interface 236 (e.g., if the user 204 is inputting order details at their mobile device and those order details are then communicated to the dispensing controller 232 by way of the mobile device interface 236).

Selections of goods by the user 204 may result in the desired quantity, or amount, of a bulk consumable good not being available at the current distribution location 112. The inventory management system 156 may communicate with the distribution control center 108 to determine an alternate distribution center 112 to satisfy the customer's 204 local order (step 1218). For example, the distribution management instruction set 128 of the distribution control center 108 may be configured to determine an alternate distribution center 112. Alternatively, or additionally, the inventory management system 156 or distribution control center 108 may suggest an alternate bulk consumable good that is available at the current distribution center 112. The suggestion of an alternate bulk consumable goods may be based on past transaction history stored in the distribution database 144 for the customer 204, as described in FIGS. 11 and 13. The current distribution location may fulfill a portion of the order and/or the user 204 may travel to another distribution location 112 for dispensing of the order or the order may be shipped to the user 204, as shown in FIG. 13.

The user 204 may be allowed to continue providing order details and requesting more bulk consumable goods as part of the order. Eventually, the user 204 may indicate that the order is complete and ready for dispensing by the dispensing system 148 (step 1220). At this point, the dispensing controller 232 may determine whether the order requires prepayment before dispensing is allowed (step 1224). If this query is answered negatively, then the dispensing controller 232 may automatically initiate fulfillment of the order and begin dispensing goods based on the types and quantities identified in the order (step 1228). As each good is dispensed, the dispensing controller 232 may cause the printer 244 to print a label or ticket for each dispensed good (step 1232). The label or ticket for each dispensed good may then be carried by the user 204 to a POS terminal to finalize payment for the dispensed goods with the POS system 248.

Referring back to step 1224, if the query is answered affirmatively, then the method continues with the dispensing controller initiating a prepayment routine (step 1236). In some embodiments, the dispensing logic 312 may invoke the POS system 248 to begin the prepayment routine by issuing a payment instruction to the POS system 248 through the payment/POS API 340. The payment instruction may include an identification of the type, amount, and price of each good to be dispensed by the dispensing system 148. Once the user 204 finalizes payment with the POS system 248 and the dispensing logic 312 determines that the prepayment has been received at the POS system 248 (step 1240), the dispensing logic 312 may begin the process or dispensing the appropriate amount of identified goods via actuation of the various dispensers 212, 220, 228 (step 1244).

With reference now to FIG. 13, a method of enabling a user 204 to place a remote order with a user device 160 for bulk consumable goods that are shipped to the user 204 will be described in accordance with at least some embodiments of the present disclosure. The method begins by enabling the user 204 to engage in a web-based session with the distribution control server 108 (step 1304). In some embodiments, the user device 160 is presented with one or more pages (e.g., html pages, mobile web pages, etc.) that enable the user 204 to place an order for one or more goods with the remote order management instruction set 136.

The method continues by determining that the user's 204 order includes one or more bulk consumable goods (step 1308). The type, amount, and pricing associated with each bulk consumable good is determined (step 1312) by the remote order management instruction set 136 and added to a shopping cart or the like for the user's 204 order.

The method then continues by providing suggestions for alternate bulk consumable goods (step 1314) based on prior transactions, similar goods, and/or transactions of other users 204, as described in FIGS. 11 and 12.

The method then continues by prompting the user 204 for payment in connection with the order (step 1316). When the user 204 finalizes payment for the order (step 1318), the remote order management instruction set 136 may confirm payment and shipping details to ensure that the payment satisfies the order and the goods contained in the order based on current pricing of the goods and the amount of each good ordered by the user 204 and the user's 204 shipping address is correct (step 1320).

The information regarding the order details may then be transmitted to the selected distribution location(s) 112 and/or the physical distribution asset 116 (step 1324). In this step, the remote order management instruction set 136 may communicate details regarding all bulk consumable goods in the order including, without limitation, type, amount, and purchase price for the bulk consumable good(s). The details of the order may then the added to the remote order queue 320 of each dispensing controller 232 that receives the information from the remote order management instruction set 136 (step 1334).

Thereafter, the remote order management instruction set 136 may instruct the physical distribution asset 116 to dispense the goods into reusable packages and to ship the packages to the user 204 via a distribution method (e.g., courier, shipping truck, drone, or some other distribution method) (step 1334). Alternatively, the remote order management instruction set 136 may determine one or more distribution locations 112 to dispense and ship the goods to the user 204 as one or more shipments.

Once the package(s) is shipped that completes the remote order, the remote order is marked as fulfilled. If multiple shipments from one or more distribution locations and/or the physical distribution asset 116 are required to satisfy the remote order, then the remote order is marked as fulfilled after the last shipment is transferred to the courier. A confirmation of the one or more shipments may be sent to the customer 204 via email, text message, voice message, and/or other confirmation methods.

Figure 14:
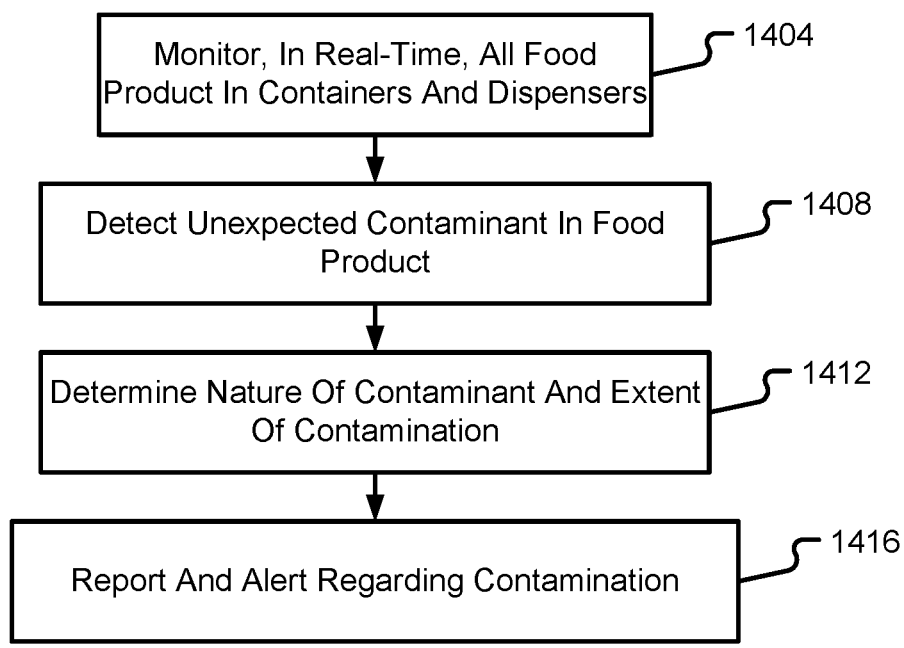
FIG. 14 is a flow diagram depicting a contaminant detection method in accordance with at least some embodiments of the present disclosure.

With reference now to FIG. 14, a method of monitoring for and responding to detected contaminations will be described in accordance with at least some embodiments of the present disclosure. The method begins by enabling one or more of the sensors in the consumables dispensing system 148 to monitor the various containers 208, 216, 224 and/or dispensers 212, 220, 228 (step 1404). In some embodiments, the sensors may be configured to monitor for chemical contaminants and/or biological contaminants. Alternatively or additionally, the one or more sensors may be configured to detect a particular protein (e.g., an allergen) that should not otherwise be present within a particular container or dispenser (e.g., a possible cross-contamination of bulk goods). Sensors that are configured to detect metal or other mineral based contaminants may be used (e.g., metal sensors, magnetic field sensors, etc.).

The method continues when one or more unexpected contaminants are detected in a food product (step 1408). Specifically, a sensor may detect one or more contaminants that are otherwise not intended to be in a particular container or dispenser. The method will continue by determining the nature of the contaminant and the extent of the contamination (step 1412). This information may then be reported to a centralized distribution control server 108 (step 1416). Alternatively or additionally, one or more alerts or alarms may be provided at the distribution location 112 to indicate that a contamination has occurred. The alarming of a contamination may be different and more immediate than a reporting of the contamination. For instance, a reporting of the contamination may include both a date, time, and determined extent of the contamination whereas the alarming may simply provide an indication that some type of contamination has occurred without providing the details otherwise provided in a report. This particular method may help enable the system to monitor and report on the integrity of the goods being dispensed to minimize the impact tampered goods would have on consumers. For instance, the monitoring and reporting method disclosed herein could detect and report when some person inadvertently or purposefully adds a poison to the bulk batch of liquids being dispensed. The system may, therefore, preclude a person from otherwise taking an opportunity to poison or contaminate a food product either during the manufacturing process or filling of the containers. This system may be configured to monitor the integrity of the food to minimize the danger that consumers have should such an event take place.

Specific details were given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

What is claimed is:

1. A system for dispensing a plurality of bulk consumable goods among a plurality of bulk goods distribution locations, the system comprising:
a first payment system located at a first bulk goods distribution location;
a first bulk consumables dispensing system co-located with the first payment system at the first bulk goods distribution location, the first bulk consumables dispensing system comprising:
a first plurality of containers each being configured to store a bulk consumable good;
a first plurality of dispensers, wherein each dispenser in the first plurality of dispensers is coupled to a corresponding container in the first plurality of containers and is further configured to dispense the bulk consumable good stored in the corresponding container;
a first dispensing controller coupled to each of the first plurality of dispensers, wherein the first dispensing controller comprises:
first dispensing logic that, when executed by a first processor, enables the first dispensing controller to actuate a first selected dispenser from the first plurality of dispensers and cause the first selected dispenser to dispense a first predetermined amount of the bulk consumable good stored in the corresponding container;
a first price controller that dynamically adjusts prices of the bulk consumable goods stored in the first plurality of containers in response to first instructions received from the first payment system; and
a first payment Application Programming Interface (API) that enables the first price controller to communicate with the first payment system;
a second payment system located at a second bulk goods distribution location;
a second bulk consumables dispensing system co-located with the second payment system at the second bulk goods distribution location, the second bulk consumables dispensing system comprising:
a second plurality of containers each being configured to store a bulk consumable good;
a second plurality of dispensers, wherein each dispenser in the second plurality of dispensers is coupled to a corresponding container in the second plurality of containers and is further configured to dispense the bulk consumable good stored in the corresponding container;
a second dispensing controller coupled to each of the second plurality of dispensers, wherein the second dispensing controller comprises:
second dispensing logic that, when executed by a second processor, enables the second dispensing controller to actuate a second selected dispenser from the second plurality of dispensers and cause the second selected dispenser to dispense a second predetermined amount of the bulk consumable good stored in the corresponding container;
a second price controller that dynamically adjusts prices of the bulk consumable goods stored in the second plurality of containers in response to second instructions received from the second payment system; and
a second payment Application Programming Interface (API) that enables the second price controller to communicate with the second payment system;
a distribution control server configured to communicate with the first payment system and the second payment system and to instruct the first payment system and the second payment system to dynamically adjust prices at the first bulk consumables dispensing system and second bulk consumables dispensing system, respectively, wherein the distribution control server instructs the first payment system and the second payment system with different pricing instructions, and wherein the distribution control server comprises a remote order management instruction set that receives a remote order determines the remote order will be picked up at the first bulk goods distribution location instead of the second bulk goods distribution location, and provides the first bulk consumables dispensing system with information describing the remote order; and an Artificial Intelligence (AI) model that receives input data from a distribution database and that makes multiple parallel decisions based on the received input data, wherein the AI model controls pricing at the first payment system and the second payment system.

2. The system of claim 1, wherein the distribution control server communicates with the first payment system and the second payment system via a communication network using an Internet Protocol (IP).

3. The system of claim 1, wherein the remote order is received from a customer.

4. The system of claim 3, wherein the information describing the remote order comprises an identification of a type of bulk consumable good purchased by the customer and a remote order purchase price.

5. The system of claim 4, wherein the remote order purchase price included in the information describing the remote order is different from a price displayed for the type of bulk consumable good when purchased at the first bulk consumables dispensing system.

6. The system of claim 4, further comprising:
a biometric recognition system configured to capture biometric information from the customer and compare the captured biometric information with user identification information stored in association with the remote order.

7. The system of claim 6, wherein the first dispensing logic is only allowed to fulfill the remote order in response to the biometric recognition system determining that the captured biometric information substantially matches the user identification information stored in association with the remote order.

8. The system of claim 1, further comprising:
a first Point of Sale (POS) system that is configured to process payments for the first payment system; and
a second POS system that is configured to process payments for the second payment system.

9. The system of claim 1, further comprising:
the distribution database that maintains information describing inventory levels at the first bulk consumables dispensing system and the second bulk consumables dispensing system and that is updated, in real-time, when bulk consumable goods are dispensed at the first bulk consumables dispensing system and the second bulk consumables dispensing system.

10. The system of claim 9, wherein the AI model is updateable in response to newly validated data being added to the distribution database.

* * * * *